(12) United States Patent
Khosla et al.

(10) Patent No.: US 12,245,124 B2
(45) Date of Patent: Mar. 4, 2025

(54) METHOD AND APPARATUS FOR COMMUNICATING COLLISION RELATED INFORMATION

(71) Applicant: QUALCOMM Incorporated, San Diego, CA (US)

(72) Inventors: Abha Khosla, San Diego, CA (US); Soumya Das, San Diego, CA (US); Srujith Reddy Katamreddy, Ingolstadt (DE); Phani Kumar Dasam, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/702,006

(22) Filed: Mar. 23, 2022

(65) Prior Publication Data

US 2023/0308849 A1   Sep. 28, 2023

(51) Int. Cl.
*H04W 4/90* (2018.01)
*H04W 4/40* (2018.01)

(52) U.S. Cl.
CPC .............. *H04W 4/90* (2018.02); *H04W 4/40* (2018.02)

(58) Field of Classification Search
CPC ........... H04W 4/90; H04W 4/40; H04W 4/38; H04W 4/44; G08G 1/162; G08G 1/164; G08G 1/166
See application file for complete search history.

(56) References Cited

U.S. PATENT DOCUMENTS

2017/0374324 A1   12/2017   Loftus
2021/0304592 A1*   9/2021   Lepp .................... G07C 5/008

OTHER PUBLICATIONS

International Search Report and Written Opinion—PCT/US2023/012236—ISA/EPO—May 31, 2023.

* cited by examiner

*Primary Examiner* — Chi H Pham
*Assistant Examiner* — Samuel Dilan Rutnam
(74) *Attorney, Agent, or Firm* — Thien T. Nguyen

(57) ABSTRACT

A communication device mounted on a vehicle, e.g., On-Board Unit (OBU), communicates collision related information to other road entities, e.g., other vehicles or roadside units (RSUs) or a server, after a collision is detected. The OBU may temporarily store basic safety messages (BSMs) (and optionally sensor data) for a predesignated number of seconds before discarding the BSMs (and optionally sensor data) on a continuing basis. When a collision is detected, the OBU sends a report, e.g., to a server, with the stored BSMs (and optionally sensor data) to a server. After a collision detection, the OBU may send a request to other vehicles to upload relevant collision related information. Additionally, if a first vehicle detects the collision of a second vehicle, the first vehicle may communicate collision related information to other entities and a server.

45 Claims, 7 Drawing Sheets

METHOD AND APPARATUS FOR COMMUNICATING COLLISION RELATED INFORMATION

BACKGROUND

Background Field

The subject matter disclosed herein relates to wireless communications systems, and more particularly to methods and apparatuses for safety related communications for a vehicle based user equipment in a distributed wireless communications system.

RELEVANT BACKGROUND

Vehicular communication systems are areas of active interest in the communications industry for providing information useful in transportation. Vehicular communication systems, for example, include nodes, such as roadside units (RSUs) and the vehicles themselves, that wirelessly transmit traffic related information and is being developed as part of intelligent transportation systems (ITS). For example, vehicular communication systems include direct communication systems, such as dedicated short-range communication (DSRC), cellular Vehicle-to-Everything (C-V2X) communication, and even 5G New Radio (NR) communications.

The traffic related information to be communicated in currently contemplated vehicular communication systems is related to safety applications. For example, message exchanges currently contemplated in vehicular communication systems are directed to aspects such as safety warnings, traffic congestions (e.g., automated traffic control), and coordinated or automated vehicle maneuvering. In addition to supporting safety applications, C-V2X technology, specifically NR C-V2X, is contemplated for advanced use cases such as sensor sharing, cooperative driving, and platooning. Additional use cases for vehicular communication systems are desirable.

SUMMARY

A communication device mounted on a vehicle, e.g., On-Board Unit (OBU), communicates collision related information to other road entities, e.g., other vehicles or roadside units (RSUs) or a server, after a collision is detected for the vehicle in which the OBU is location or another vehicle. The OBU may temporarily store basic safety messages (BSMs) (and optionally sensor data) for a predesignated number of seconds before discarding the BSMs (and optionally sensor data) on a continuing basis. When a collision is detected, the OBU sends a report, e.g., to a server, with the stored BSMs (sensor data) to a server. After a collision detection, the OBU may send a request to other vehicles to upload relevant collision related information. Additionally, if a first vehicle detects the collision of a second vehicle, the first vehicle may communicate collision related information to other entities and a server.

In one implementation, a method performed by an On-Board Unit (OBU) for a vehicle for communicating collision related information, the method includes temporarily storing previous N seconds of basic safety messages (BSMs) on a continuing basis; detecting a collision of the vehicle; and sending a report after detection of the collision with the previous N seconds of the BSMs to a server.

In one implementation, an On-Board Unit (OBU) for a vehicle configured for communicating collision related information, includes at least one wireless transceiver configured to wirelessly communicate with network entities; one or more sensors, at least one memory; and at least one processor coupled to the wireless transceiver, the one or more sensors, and the at least one memory, the at least one processor configured to: temporarily store previous N seconds of basic safety messages (BSMs) on a continuing basis; detect, via the one or more sensors, a collision of the vehicle; and send, via the at least one wireless transceiver, a report after detection of the collision with the previous N seconds of the BSMs to a server.

In one implementation, an On-Board Unit (OBU) for a vehicle configured for communicating collision related information, includes means for temporarily storing previous N seconds of basic safety messages (BSMs) on a continuing basis; means for detecting a collision of the vehicle; and means for sending a report after detection of the collision with the previous N seconds of the BSMs to a server.

In one implementation, a non-transitory storage medium including program code stored thereon, the program code is operable to configure at least one processor in an On-Board Unit (OBU) for a vehicle for communicating collision related information, the program code comprising instructions to: temporarily store previous N seconds of basic safety messages (BSMs) on a continuing basis; detect a collision of the vehicle; and send a report after detection of the collision with the previous N seconds of the BSMs to a server.

In one implementation, a method performed by an On-Board Unit (OBU) for a vehicle for communicating collision related information, the method includes detecting a collision of the vehicle; and broadcasting a message to other entities after detection of the collision requesting that the other entities upload collision related information.

In one implementation, an On-Board Unit (OBU) for a vehicle configured for communicating collision related information, includes at least one wireless transceiver configured to wirelessly communicate with network entities; one or more sensors, at least one memory; and at least one processor coupled to the wireless transceiver, the one or more sensors, and the at least one memory, the at least one processor configured to: detect, via the one or more sensors, a collision of the vehicle; and broadcast, via the at least one wireless transceiver, a message to other entities after detection of the collision requesting that the other entities upload collision related information.

In one implementation, an On-Board Unit (OBU) for a vehicle configured for communicating collision related information, includes means for detecting a collision of the vehicle; and means for broadcasting a message to other entities after detection of the collision requesting that the other entities upload collision related information.

In one implementation, a non-transitory storage medium including program code stored thereon, the program code is operable to configure at least one processor in an On-Board Unit (OBU) for a vehicle for communicating collision related information, the program code comprising instructions to: detect a collision of the vehicle; and broadcast a message to other entities after detection of the collision requesting that the other entities upload collision related information.

In one implementation, a method performed by an On-Board Unit (OBU) for a vehicle for communicating collision related information, the method includes temporarily storing previous N seconds of basic safety messages (BSMs) on a continuing basis; temporarily storing a previous M seconds of sensor information on a continuing basis; receiving a message from an OBU for a second vehicle after the second vehicle was involved in a collision, the message requesting that the other entities upload collision related information; and sending a report comprising at least one of the BSMs and sensor information related to the collision to a server.

In one implementation, an On-Board Unit (OBU) for a vehicle configured for communicating collision related information, includes at least one wireless transceiver configured to wirelessly communicate with network entities; one or more sensors, at least one memory; and at least one processor coupled to the wireless transceiver, the one or more sensors, and the at least one memory, the at least one processor configured to: temporarily store previous N seconds of basic safety messages (BSMs) on a continuing basis; temporarily store a previous M seconds of sensor information from the one or more sensors on a continuing basis; receive, via the at least one wireless transceiver, a message from an OBU for a second vehicle after the second vehicle was involved in a collision, the message requesting that the other entities upload collision related information; and send, via the at least one wireless transceiver, a report comprising at least one of the BSMs and sensor information related to the collision to a server.

In one implementation, an On-Board Unit (OBU) for a vehicle configured for communicating collision related information, includes means for temporarily storing previous N seconds of basic safety messages (BSMs) on a continuing basis; means for temporarily storing a previous M seconds of sensor information on a continuing basis; means for receiving a message from an OBU for a second vehicle after the second vehicle was involved in a collision, the message requesting that the other entities upload collision related information; and means for sending a report comprising at least one of the BSMs and sensor information related to the collision to a server.

In one implementation, a non-transitory storage medium including program code stored thereon, the program code is operable to configure at least one processor in an On-Board Unit (OBU) for a vehicle for communicating collision related information, the program code comprising instructions to: temporarily store previous N seconds of basic safety messages (BSMs) on a continuing basis; temporarily store a previous M seconds of sensor information on a continuing basis; receive a message from an OBU for a second vehicle after the second vehicle was involved in a collision, the message requesting that the other entities upload collision related information; and send a report comprising at least one of the BSMs and sensor information related to the collision to a server.

In one implementation, a method performed by an On-Board Unit (OBU) for a vehicle for communicating collision related information, the method includes detecting a collision of a second vehicle; obtaining collision related information for the collision of the second vehicle; and broadcasting a message to other entities after detection of the collision, the message indicating the collision has been detected and including the collision related information.

In one implementation, an On-Board Unit (OBU) for a vehicle configured for communicating collision related information, includes at least one wireless transceiver configured to wirelessly communicate with network entities; one or more sensors, at least one memory; and at least one processor coupled to the wireless transceiver, the one or more sensors, and the at least one memory, the at least one processor configured to: detect, via the one or more sensors, a collision of a second vehicle; obtain collision related information for the collision of the second vehicle; and broadcast, via the at least one wireless transceiver, a message to other entities after detection of the collision, the message indicating the collision has been detected and including the collision related information.

In one implementation, an On-Board Unit (OBU) for a vehicle configured for communicating collision related information, includes means for detecting a collision of a second vehicle; means for obtaining collision related information for the collision of the second vehicle; and means for broadcasting a message to other entities after detection of the collision, the message indicating the collision has been detected and including the collision related information.

In one implementation, a non-transitory storage medium including program code stored thereon, the program code is operable to configure at least one processor in an On-Board Unit (OBU) for a vehicle for communicating collision related information, the program code comprising instructions to: detect a collision of a second vehicle; obtain collision related information for the collision of the second vehicle; and broadcast a message to other entities after detection of the collision, the message indicating the collision has been detected and including the collision related information.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
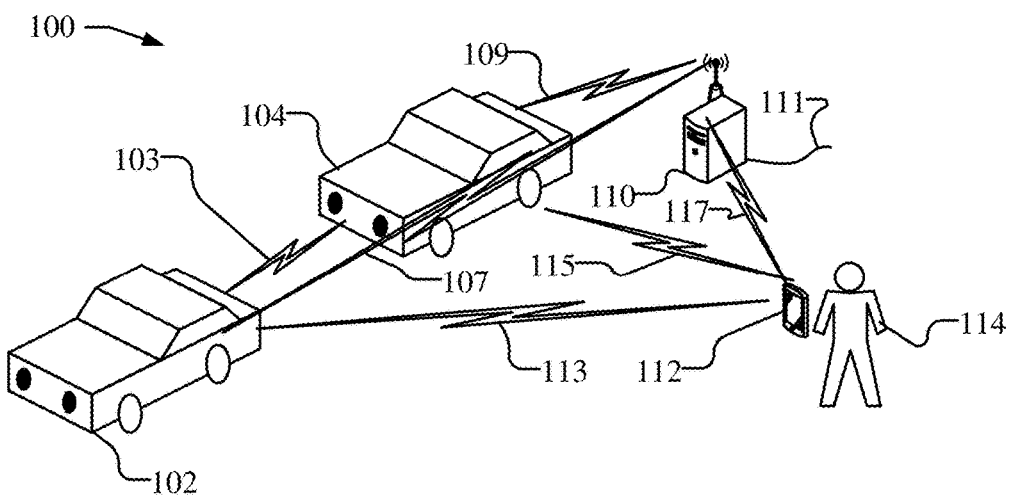
FIG. 1 illustrates a wireless communication system that uses direct wireless communications between V2X entities in the wireless communication system.

Vehicular communication systems, such as Vehicle to Everything (V2X), may be used, for example, for safety related applications, such as safety warnings, traffic congestions (e.g., automated traffic control), and coordinated or automated vehicle maneuvering. Application layer messages and information elements (IEs) to support safety related applications are being defined by various standards development organizations. For example, Society of Automotive Engineers (SAE) is preparing work item J3186 Maneuver Sharing and Coordinating Service and J2945/6 Performance Requirements for Cooperative Adaptive Cruise Control and Platooning. In China, Baidu has initiated a Phase 3 message definition effort for coordinated driving. Such messages are prerequisites for intelligent transportation systems (ITS), for example, for coordinated or automated vehicle maneuvering and traffic control.

For example, for safe operation of vehicles, such as autonomous vehicles, messaging between a user equipment (UE) on board a vehicle (sometimes referred to as an on-board unit (OBU) other nearby OBUs, infrastructure, e.g., roadside units (RSUs), and pedestrian held user UEs may be performed using direct or indirect communication systems, such as dedicated short-range communication (DSRC), cellular Vehicle-to-Everything (C-V2X) communication, and even 5G New Radio (NR) communications, sometimes referred to as NR C-V2X. In addition to supporting safety applications, C-V2X technology, specifically NR C-V2X, may be leveraged for advanced use cases such as sensor sharing, cooperative driving, platooning, etc.

While C-V2X is premised on safety critical applications for collision avoidance, there will continue to be accidents, e.g., collisions between vehicles or with other objects, until there is mass adoption of this technology and the accident rate drops to nil. For example, until mass adoption of autonomous vehicles, accidents may continue to occur due to violation of traffic rules, driving under the influence, sudden or unsafe breaking or lane changing, distracted driving, speeding, etc. Until mass adoption occurs along with attending drop accident rate, there will continue to be a need to investigate unfortunate accidents/collisions, e.g., for liability purposes, insurance claims, etc. Currently, however, no mechanism exists in current specifications, such as SAE specifications, to utilize vehicular communication systems, such as C-V2X messages, to assist in the determination of collisions.

Accordingly, in some aspects of the disclosure herein, an OBU for a vehicle may communication collision related information of the vehicle, or another vehicle, after a collision is detected. In some implementations, an OBU may temporarily store basic safety messages (BSMs) for a pre-designated number N of seconds before discarding the BSMs on a continuing basis. When a collision is detected, the OBU sends a report, e.g., to a server, with the previous N seconds of BSMs to a server. In some implementations, in addition to BSMs, the OBU may additionally store sensor information, such as camera data, radar data, lidar data, etc., for a predesignated number of seconds, and after detection of the collision, the sensor information is likewise sent to the server. In some implementations, after the detection of the collision, the OBU may broadcast a message to other entities, e.g., other OBU entities, infrastructure entities, or UEs, requesting that the other entities upload any collision related information, e.g., stored BSMs and/or sensor information. The OBUs that were not involved in the collision may send stored collision related information to the server. The information received by the server may be used to determine the cause of the accident and any preventive method that can be incorporated to avoid similar collisions.

In some implementations, an OBU for a first vehicle may detect a collision of a second vehicle (the collision may not involve the first vehicle). After the detection of the collision, the first vehicle may broadcast a message to other entities, e.g., other OBU entities, infrastructure entities, or UEs, that indicates that the collision has been detected and may provide collision related information in the message. The collision related information, for example, may include an identifier of the second vehicle, such as a license plate number, a color, a make, a model, or any combination thereof, and may include additional information, such as speed, acceleration, path, location, etc. The collision related information may be used, e.g., to assist with avoiding the scene or the collision or to provide aid at the collision.

In general, there are two modes of operation for V2X services, as defined in Third Generation Partnership Project (3GPP) TS 23.285. One mode of operation uses direct wireless communications between entities, which may sometimes be referred to as sidelink communication. The other mode of operation uses network based wireless communication between entities. The two modes of operation may be combined, or other modes of operation may be used if desired.

FIG. 1 illustrates a V2X wireless communication system 100 in which V2X services operate using direct wireless communications between V2X entities, including a first vehicle UE (OBU) 102 (illustrated as a car), a second OBU 104, a roadside unit (RSU) 110, and a pedestrian 114 held UE 112. As illustrated, the OBU 102 may directly communicate with various other network entities wirelessly, such as the second OBU 104 via a V2V communication link 103, the RSU 110 via a Vehicle-to-Infrastructure (V2I) communication link 107, or the UE 112 via a Vehicle-to-Pedestrian (V2P) communication link 113. The OBU 104 may likewise directly communicate with various other network entities wirelessly, such as the RSU 110 via a V2I communication link 109, or the UE 112 via a V2P communication link 115. As illustrated, the RSU 110 may communicate with the OBU 102 via V2P communication link 117.

The wireless communication, for example, may be over, e.g., Proximity-based Services (ProSe) Direction Communication (PC5) reference point as defined by the 3rd Generation Partnership Project (3GPP) body of standards, such as in Technical Specification (TS) 23.303, and may use wireless communications under IEEE 1609, Wireless Access in Vehicular Environments (WAVE), Intelligent Transport Systems (ITS), dedicated short range communications (DSRC), cellular Vehicle-to-Everything (C-V2X), and IEEE 802.11p, on the ITS band of 5.9 GHz, or other wireless connections directly between entities. During direct communications with one or more entities in the V2X wireless communication system 100, each entity provides V2X information, such as an identifier for the V2X entity, as well as other information in messages such as Common Awareness Messages (CAM) and Decentralized Notification Messages (DENM) or Basic Safety Message (BSM), which may be used for, e.g., Advanced Driver Assistance System (ADAS) or safety use cases, such as lane changes, speed changes, overtaking speeds, etc. As discussed, herein, one or more messages may be transmitted in the V2X wireless communication system 100 to support communication of collision related information.

Figure 2:
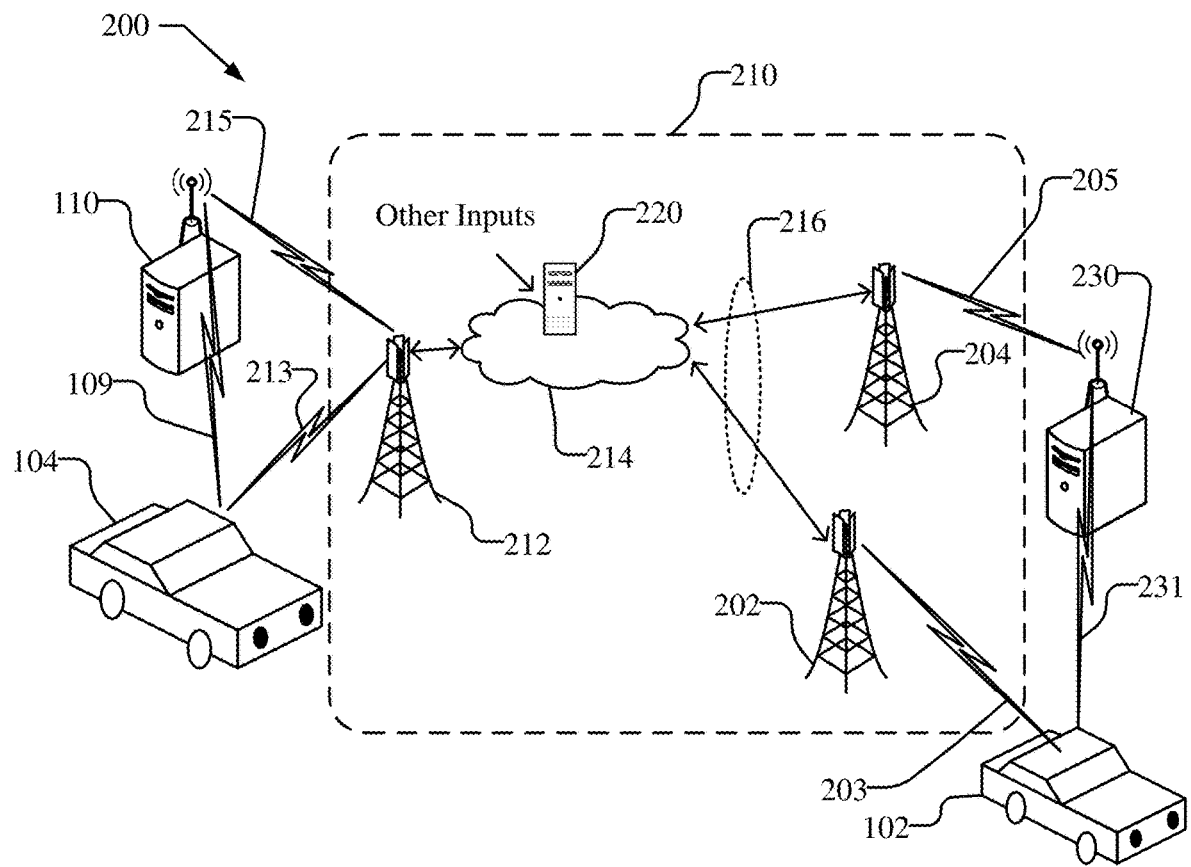
FIG. 2 illustrates a wireless communication system that uses indirect wireless communications between V2X entities in the wireless communication system.

FIG. 2 illustrates a Vehicle-to-Network (V2N) wireless communication system 200 in which V2X services operate using a wireless network between entities, such as Wireless Wide Area Networks (WWAN). For example, entities may communicate via the Long Term Evolution (LTE) network or 5G New Radio (NR) network, where the radio interface between the user equipment (UE) and the base stations is referred to as Uu, e.g., LTE-Uu or NR-Uu. As illustrated, the wireless entities, such as OBUs 102 and 104, the RSU 110, RSU 230, or OBU 102, may wirelessly communicate with other network entities in the wireless communication system 200, through the network infrastructure 210, which for the sake of example, will be referred to as an 5G NR network, but may be an LTE network or other type of network. As illustrated, the OBU 102 may wirelessly communicate with the network infrastructure 210, e.g., a base station 202, referred to as a gNodeB in a 5G NR network infrastructure 210 (or eNodeB in the LTE network infrastructure), via a Uu interface 203. As illustrated, in some implementations, the OBU 102 may directly communicate with the RSU 230 via communication link 231, which interfaces with a base station 204 via a Uu interface 205. In some implementations, infrastructure entities, such as RSU 110 and/or 230 may communicate with the network infrastructure 210 via wired communication links.

The base station 202 may communicate with other base stations, e.g., base station 212 through the IP layer 214 and network 216, such as an Evolved Multimedia Broadcast Multicast Services (eMBMS)/Single Cell Point To Multipoint (SC-PTM) network. The server 220 may be part of or connected to the IP layer 214, as illustrated, or may be external to the IP layer 214 and the network infrastructure 210. The base station 212 may wirelessly communicate with the OBU 104 directly or through other V2X entities, such as RSU 110 via Uu interfaces 213 or 215 and 109. The V2N communication using the "Uu" interface may be used to exchange messages using, e.g., C-V2X, 5G NR communications, etc. The information exchange may be similar to that discussed above, including messages related to support communication of collision related information, but the information exchange is over a greater distance than the direct communications shown in FIG. 1.

The server 220 illustrated in network infrastructure 210 may receive and route communications between entities, and or may receive and store collision related information from one or more entities in the wireless communication system 200, as discussed herein. It should be understood that while a single server 220 is illustrated, multiple connected or unconnected servers may be used to receive and store collision related information. After one or more servers 220 have received and stored collision related information, various interested parties, e.g., authorities, insurance companies, etc., may access the one or more servers 220 and use the collision related information to determine a cause and/or liability for the accident, as well as possible preventive measures to avoid similar collisions.

In some implementations, OBUs of vehicles may temporarily store broadcast and received BSMs for a predetermined number N of seconds before the BSMs are discarded, which is contrary to current methodology in which BSMs are not stored once they are transmitted or received. Additionally, in some implementations, sensor information, such as camera data, radar data, lidar data, accelerometer data, etc., may be temporarily stored, e.g., for a predetermined number M of seconds, which may be the same or different than the number of seconds stored for the BSMs. When a OBU of a vehicle involved in a collision, referred to herein as the "host vehicle" (HV), detects that the vehicle is involved in a collision, the OBU will the send the last N seconds of BSMs and last M seconds of sensor information to a server, which may analyze the information offline. In some implementations, the OBU may save the previous N seconds of BSMs, and optionally, the previous M seconds of sensor information, e.g., to non-volatile memory, for future reference, e.g., to send wirelessly at a later time (if for example, wireless transmission is not immediately available) or to provide access via a wired connection.

The host vehicle may additionally solicit collision related information, e.g., crowdsource, other vehicles, referred to herein as "remote vehicles" (RV), that are in the vicinity at the time of the collision. The collision related information may be any sensor information, e.g., camera data, that may assist in the understanding of the events that led to the collision. The use of sensor information, e.g., images or video, from remote vehicles is useful in understanding a collision as it is from another vantage point. The sensor information, for example, may be saved for a predetermined number M of seconds and after receiving a request from the host vehicle, the OBU of a remote vehicle may send the previous M seconds of sensor information to a server. Any relevant BSMs received or broadcast by the remote vehicles may similarly be crowdsourced.

The information gathered from various sources, e.g., host vehicle and/or remote vehicles, may be used offline to assist in determining a cause of the accident, such as understanding the behaviors of parties involved, and any preventive method that can be incorporated to avoid similar collisions.

Additionally, if an OBU in a vehicle detects a collision of another vehicle, e.g., based on sensor information including video or ranging information data, the OBU may broadcast a message to other entities, e.g., other OBUs and infrastructure entities, that an accident occurred. Collision related information related to the collision, such as one or more identifiers of the vehicle involved in the collision may be extracted from the sensor information and included in the broadcast message. For example, the identifier of the vehicle may include at least one of a license plate number, a color, a make, a model, confidence for identifier, speed, acceleration, path, location, or any combination.

Figure 3:
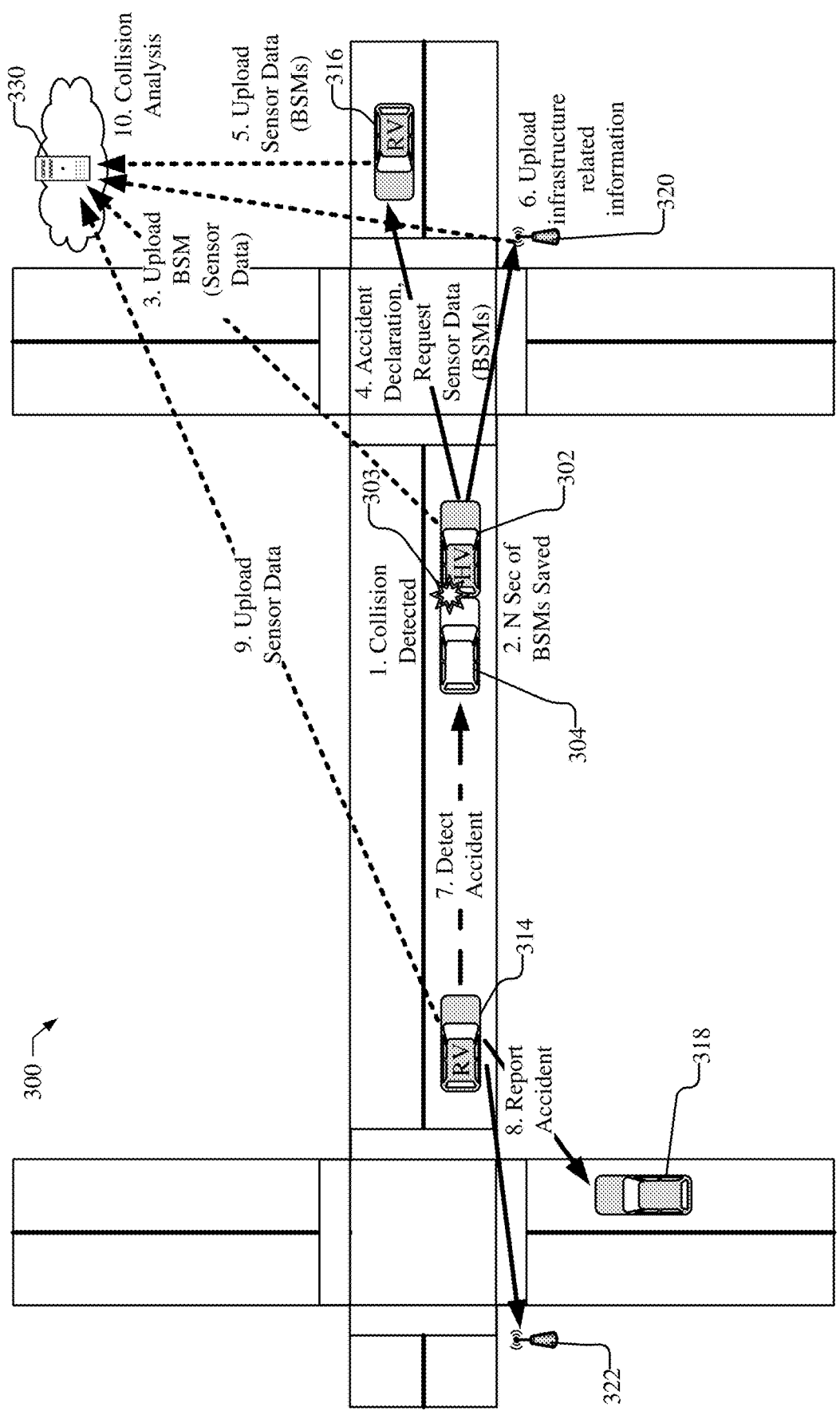
FIG. 3 illustrates a V2X network that supports communication of collision related information between various V2X entities and a server.

FIG. 3 illustrates a V2X network 300 that supports communication of collision related information as described herein. The V2X network 300 may use direct wireless communications between entities (such as illustrated in FIG. 1) and network based wireless communication between entities (such as illustrated in FIG. 2) although infrastructure elements, such as base stations, are not illustrated in FIG. 3.

FIG. 3 illustrates a vehicles 302 and 304 that have been involved in a collision, illustrated by the starburst 303. The vehicle 302 is a V2X enabled vehicle and is referred to as the host vehicle, as it was involved in the collision. Vehicle 304 in FIG. 3 is not a V2X enabled vehicle, and thus, is not capable of communication of collision related information. In some implementations, however, vehicle 304 may be a V2X enabled vehicle, and may operate in a manner similar to vehicle 302. FIG. 3 additionally illustrates a number of remote vehicles, e.g., vehicles 314, 316, and 318, as well as infrastructure entities, e.g., RSUs 320 and 322, and a server 330, which may be a single server or multiple separate servers.

As discussed above, the OBU of the V2X vehicles, including the host vehicle 302 and remote vehicles 314, 316, and 318, temporarily stores BSMs that are broadcast and received for a predetermined number N of seconds before discarding the BSMs, which is performed on a continuing basis. The predetermined number N may be configurable, e.g., by the user, manufacturer, insurance company, etc. The number N might be variable, e.g., and may be a function of processing load or environmental conditions, such as weather conditions, road conditions, road congestion, speed limit, speed of the vehicle, etc. Additionally, in some implementations, the OBU of the V2X vehicles, including the host vehicle 302 and remote vehicles 314, 316, and 318, may temporarily store sensor information, such as camera data, radar data, lidar data, accelerometer data, etc., for a predetermined number M of seconds, before discarding the sensor information, which is performed on a continuing basis. The number M of seconds may similarly be configurable and may vary based on processing load or environmental conditions. In some implementations, different sensor information may be stored for different amounts of time before being discarded. Thus, the V2X vehicles capture the BSMs, as well as optionally all relevant information from all its sensors, including camera, radar etc. and any locally computed information for the previous N seconds window, and progressively moves the window as time elapses if there is no accident detected. Once an accident is detected, the window is frozen and the stored data is dumped to non-volatile memory, so that it may be safely stored for future retrieval, including immediate transmission to a remote server 330.

As illustrated at stage 1, a processing unit in the host vehicle 302 detects the collision with vehicle 304. The collision or accident may be detected using crash determination algorithms processing sensor fusion information from camera and other sensors in the vehicle to detect specific collision criteria, such as the vehicle coming to a sudden stop due to a collision. The collision may be detected, for example, based on multiple factors, including sensor information from impact sensors, pressure sensors, accelerometers, etc., which may detect, e.g., an impact with another vehicle, object, or pedestrian, or a sudden change in gravitational forces indicating a roll-over. Additionally or alternatively, other sensors may be used, such as cameras and range sensors (radar, lidar, ultrasound), a sensor that detects deployment of an air bag, etc.

At stage 2, after detection of the collision, the previous N seconds of stored BSMs (and optionally the previous M seconds of sensor data) are prepared for transmission to a server 330 in stage 3. In some implementations, after detection of the collision, the previous N seconds of stored BSMs (and optionally the previous M seconds of sensor data) may be saved in non-volatile memory for later transmission or future access. For example, after detection of a collision, the electronic control unit (ECU) in the host vehicle 302, which is typically installed at a location in the vehicle to prevent damage due to impact and thus will remain operational after the collision, may signal the OBU to permanently save the last N seconds of BSMs (and optionally the previous M seconds of sensor data) in non-volatile memory.

At stage 3, the OBU of the host vehicle 302 sends the BSMs (and optionally the sensor data) to a server 330.

At stage 4, after detection of the collision, the host vehicle 302 may broadcast a message, such as a BSM with a special flag, indicating that it has been involved in an accident, e.g., by indicating that it has stalled due to accident. The message may be received by various surrounding entities that are within range, such as vehicles, infrastructure and pedestrians, illustrated as remote vehicle 316 and RSU 320. Additionally, the host vehicle 302 may include in the same message, or in a separately broadcast message, a request for collision related information that is stored by the remote entities. The broadcast message with the request for collision related information may include additional information that may be used by the remote entities to assist in obtaining collision related information. For example, the broadcast message may include one or more of a location of the collision, a timestamp for the collision, a list of previous temporary identifiers (IDs) used by the OBU of the host vehicle 302 for BSMs, a list of previous certificates used by the OBU of the host vehicle 302 for BSMs, an identifier for the host vehicle, an identifier for the server to which the other entities are to upload the collision related information, or any combination thereof. For example, the identifier of the OBU of the host vehicle 302 may include one or more of the layer 2 (L2) source address of vehicle at time of accident, license plate number, model of the vehicle, make of the vehicle, color of the vehicle, etc. The identifier of the server, for example, may be the server IP address and credentials for the designated server.

The telematics control unit (TCU) or other relevant unit of the remote vehicle 316 receives the broadcast message from the host vehicle 302 declaring that the host vehicle 302 met with an accident and the request for collision related information. Upon receipt of the request for collision related information, the remote vehicle 316 may prepare the temporarily stored sensor information, e.g., camera data, radar data, lidar data, etc., and in some implementations temporarily stored BSMs for transmission to a server. In some implementations, the temporarily stored sensor information may be stored into non-volatile memory for later transmission or future access. The BSMs, for example, may be broadcast or received BSMs that may be relevant to other vehicles in the area close to the location of accident, which may convey the speed, acceleration, path, trajectory of other vehicles. The TCU may feed the alert and request to the ADAS unit. In some implementations, a processor in the remote vehicle 316, e.g., the ADAS unit, may determine if sensor information captured the collision, e.g., using frame detection algorithms and the information provided in the received message, such as the host vehicle identifier information. Additionally, upon receipt of the request for collision related information, infrastructure entities, such as RSU 320, may prepare any stored infrastructure information, such as Signal Phase and Timing (SPaT), and MAP (Intersection Map) messages for transmission to a server, and in some implementations may be saved in non-volatile memory.

At stage 5, the OBU of the remote vehicle 316 sends the sensor data (and optionally the BSMs) to the server 330 (or another server). In some implementations, the remote vehicle 316 only sends sensor information that captured the collision, e.g., based on frame detection algorithms, and optionally BSMs broadcast by or received by the host vehicle 302. In some implementations, the remote vehicle 316 may send all sensor information (and optionally BSMs) to the server 330 (or another server), and the server 330 may determine if the sensor information captured the collision.

At stage 6, the RSU 320 sends the infrastructure related information, e.g., SPaT, MAP messages, etc., to the server 330 (or another server), e.g., for co-relation of traffic light changes.

At stage 7, another remote vehicle 314 may detect the collision, e.g., based on sensor information, such as camera, radar, lidar, etc. data. For example, the camera data may be analyzed using object recognition techniques to determine if contact between 304 and 302 has occurred, or using ranging information to determine if sudden acceleration/deceleration forces have been applied to vehicles 304 or 302. In some implementations, remote vehicle 314, by way of example, may receive the message from the host vehicle 302 declaring that the host vehicle was in a collision and/or may detect that a collision occurred based on sensor information.

At stage 8, the remote vehicle 314 may report the detection of the collision to nearby entities, e.g., vehicle 318 and RSU 322. Vehicle 318 and RSU 322 may not receive notification of the collision from the host vehicle 302 itself, e.g., they may be out of range, but receive the report of the accident from the vehicle 318. In some implementations, the remote vehicle 314 may provide to other entities collision related information that was stored before the detection of the collision. The collision related information, for example, may include at least a portion of its sensor information, e.g., camera data, which may assist other entities, e.g., to avoid the area of collision, or to direct the entities to the area of collision (if the entity is a first responder). The vehicle 314, for example, may send the collision related information over PC5 to surrounding vehicles (vehicle 318) or RSU 322, e.g., over NR V2X if equipped. Unicast or groupcast (and possibly connection based groupcast depending on which surrounding vehicles are interested in assisting) may be used. The collision related information data may be shared using a Sensor Data Sharing Message (SDSM) or a different message.

At stage 9, the OBU of the remote vehicle 314 may send the collision related information to the server 330 (or another server). The collision related information, for example, may include data from at least one of camera, radar, lidar, or a combination thereof. If the remote vehicle 314 did not receive the request for sensor data broadcast by host vehicle 302 in stage 4, the remote vehicle 314 may send the collision related information to a separate server, which may provide notice to server 330 or may be queried by server 330 for the relevant collision related information.

At stage 10, the server 330 (or combination of servers) may perform a collision analysis offline based on the information received in stages 3, 5, 6, and 9. The server 330, for example, may stitch the sequence of events from input received from the various sources. The server 330 may, for example, replay the host vehicle 302's BSMs prior to the collision, which may be co-related to infrastructure related information, e.g., SPaT, and MAP messages, and information received from other vehicles, to determine whether the host vehicle 302 is at fault or a victim. Moreover, the server 330 may use crowdsourced sensor information captured from host vehicle 302 and remote vehicles 316 and 318, to determine the sequency of events that lead to the collision. Any number remote vehicles and RSUs may report the collision of host vehicle 302 and vehicle 304 to the server, with additional reports providing more confidence in determining the sequence of events prior to collision. The collection of collision related information from a number of sources may be particularly useful when one or more remote vehicles have only a partial view of the host vehicle before or during the collision. Reporting the collision related information from a large number of sources increases the chance of detecting the cause of accident, as the report from multiple sources may be combined for increased confidence.

As discussed above, the host vehicle 302 may send a message in stage 4 requesting remote vehicles to upload collision related information. The message sent by the host vehicle 302, for example, may be a broadcast Basic Safety Message (BSM) with an extension of the event flag used to indicate that the host vehicle met with an accident to request the collision related information. The remote vehicles, for example, may use the event flag to determine which vehicle was in a collision and use this information to save and upload the host vehicle's actions and movements prior to the accident. By way of example, Table 1 below illustrates an ASN.1 representation of VehicleSafetyExtensions, including VehicleEventFlags, which may be extended to include a request for collision related information as "eventUploadBSM."

TABLE 1

```
ASN.1 Representation:
VehicleSafetyExtensions ::= SEQUENCE {
    events          VehicleEventFlags OPTIONAL,
    pathHistory     PathHistory       OPTIONAL,
    pathPrediction  PathPrediction    OPTIONAL,
    lights          ExteriorLights    OPTIONAL,
    ...
}
ASN.1 Representation:
VehicleEventFlags ::= BIT STRING {
    eventHazardLights          (0),
    eventStopLineViolation     (1), -- Intersection Violation
    eventABSactivated          (2),
    eventTractionControlLoss   (3),
    eventStabilityControlactivated (4),
    eventHazardousMaterials    (5),
    eventReserved1             (6),
    eventHardBraking           (7),
    eventLightsChanged         (8),
    eventWipersChanged         (9),
    eventFlatTire              (10),
    eventDisabledVehicle       (11), -- The DisabledVehicle DF may also be sent
    eventAirBagDeployment      (12)
    eventUploadBSM             (13) -- Request RV to upload BSMs in case of
      accident
} (SIZE (13, ...))
```

In some implementations, the BSM may include additional data structure to identify the host vehicle in the BSM extension data. For example, as illustrated in Table 2 below, the VehicleSafetyExtensions, may include "accidentData" which may include a timestamp for the accident ("accidentTimeStamp"), and optionally the previous temporary IDs ("previoustemporaryIDList") used by the host vehicle for BSMs. Because BSMs use temporary IDs for the source vehicle that change periodically, the list of previous temporary IDs for the host vehicle may be necessary to identify BSMs associated with the host vehicle if an accident occurs immediately after the temporary ID change. Additionally, an identifier for the server to which the other entities are to upload the collision related information may be included. The remote vehicle may use the accident timestamp, temporary ID list, and server identifier to save and upload the host vehicle's actions and movements prior to the accident.

TABLE 2

```
ASN.1 Representation:
VehicleSafetyExtensions ::= SEQUENCE {
    events         VehicleEventFlags OPTIONAL,
    pathHistory    PathHistory       OPTIONAL,
    pathPrediction PathPrediction    OPTIONAL,
    lights         ExteriorLights    OPTIONAL,
    accidentData   AccidentData      OPTIONAL,
    ...
}
ASN.1 Representation:
AccidentData ::= SEQUENCE {
    accidentTimeStamp      AccidentTimeStamp,
    previoustemporaryIDList   PreviousTemporaryIDList --- Optional Contains list
        TemporaryIDs used in last N seconds (of the previous temp IDs used)
    serverID           ServerID
}
```

In some implementations, the BSM may include additional data structure to further identify the host vehicle in the BSM extension data. For example, as illustrated in Table 3 below, in addition to a timestamp for the accident ("accidentTimeStamp"), the accidentData extension may further include the previous source L2 addresses for the host vehicle ("previoussourceL2AddressList") and the list of certificates used by the host vehicle for BSM messages. The source L2 addresses are provided in a Medium Access Control (MAC) identifier in lower layers of the stack and verification certificates for the source vehicle are provided in the ITS message at the application layer. Both the source L2 address and verification certificates change periodically and independently, the list of previous source L2 addresses and certificates for the host vehicle may be necessary to identify BSMs associated with the host vehicle if an accident occurs immediately after a change in the source L2 address and/or certificates. The remote vehicle may use the accident timestamp, source L2 address, and certificate list to save and upload the host vehicle's actions and movements prior to the accident.

TABLE 3

```
ASN.1 Representation:
VehicleSafetyExtensions ::= SEQUENCE {
    events         VehicleEventFlags OPTIONAL,
    pathHistory    PathHistory       OPTIONAL,
    pathPrediction PathPrediction    OPTIONAL,
    lights         ExteriorLights    OPTIONAL,
    accidentData   AccidentData      OPTIONAL,
    ...
}
ASN.1 Representation:
AccidentData ::= SEQUENCE {
    accidentTimeStamp        AccidentTimeStamp,
    previoussourceL2AddressList   PreviousSourceL2AddressList --- Optional
        Contains list of source L2 address used in last N seconds
    previouscertificateList   PreviousCertificateList   --- Optional Contains list of
        certificates used in Last N seconds
}
```

As discussed above, remote vehicle 314 may send a message in stage 8 reporting a detected collision of the host vehicle 302. The message, for example, may be transmitted using SDSM. Existing specifications for SDSM, however, do not permit reporting regarding other vehicles that are C-V2X equipped. For example, SAE J3224 states "J3224-capable vehicles and RSUs will not transmit SDSMs about vehicles that they have received a BSM from, as such vehicles are already capable of transmitting relevant data about themselves to other V2X vehicles." Thus, referred to FIG. 3, if remote vehicle 314 received a BSM from host vehicle 302, the remote vehicle 314 would be prohibited from reporting the accident to vehicle 318 or RSU 322. However, to enable reporting of a vehicle involved in an accident, which may be C-V2X equipped, an exception to this specification may be used in the context of an accident. As illustrated in Table 4 below, a new type of detected object ("detAccidentAlt") may be used for vehicles that are involved in accident based on detection of the accident using sensor information, such as an on-board camera. The detected object may include vehicle data for the vehicle(s) involved in the accident.

TABLE 4

```
DetectedObjectData::= SEQUENCE {
    detObjCommon DetectedObjectCommonData,
    -- Common data for detected object
    detVeh DetectedVehicleData OPTIONAL,
    -- Detected vehicle data
    detVRU DetectedVRUData OPTIONAL,
    -- Detected VRU data
    detObst DetectedObstacleData OPTIONAL
```

TABLE 4-continued

```
    -- Detected obstacle data
    detAccidentAlt DetectedAccidentVehicleData OPTIONAL,
    --Detected Accident vehicle data
}
```

In some implementations, the vehicle data may include information such as the vehicles license plate number, make, model, color, speed, acceleration, path, location etc. For example, as illustrated in Table 5, below, the vehicle data may be detailed in "DetectedAccidentVehicleData," which may be used to notify authorities, RSUs, other vehicles, etc. of identifying information for the collision.

TABLE 5

```
DetectedAccidentVehicleData ::= SEQUENCE {
    lights ExteriorLights OPTIONAL,
    vehOrientation VehicleOrientationAngle OPTIONAL,
    orientationConfidence HeadingConfidence OPTIONAL,
    vehAttitude Attitude OPTIONAL,
    vehAttitudeConfidence AttitudeConfidence OPTIONAL,
    vehAngVel AngularVelocity OPTIONAL,
    vehAngVelConfidence AngularVelocityConfidence OPTIONAL,
    size VehicleSize OPTIONAL,
    height VehicleHeight OPTIONAL,
  vehicleSizeConfidence OPTIONAL,
    vehicleClass BasicVehicleClass OPTIONAL,
    classConf ClassificationConfidence OPTIONAL,
    VehLicensePlate Accident Vehicle's License plate OPTIONAL, (only
        present if DetectedObjectData includes detAccidentAlt)
    VehLicensePlateconfidence Accident Vehicle's License plate
        confidence OPTIONAL,(only present if
        DetectedObjectData includes detAccidentAlt)
    VehColor    Accident Vehicle's color OPTIONAL,
    VehColorConfidence Accident Vehicle's color Confidence
        OPTIONAL,
    VehMake     Accident Vehicles Make OPTIONAL,
    VehMakeConfidence Accident Vehicle's Make Confidence
        OPTIONAL,
    VehModel    Accident Vehicles Model OPTIONAL,
    VehModelConfidence Accident Vehicle's Model Confidence
        OPTIONAL,
    ...
}
```

In some implementations, the various confidence fields in Table 5 may be combined as a single field to minimize the SDSM size.

Figure 4:
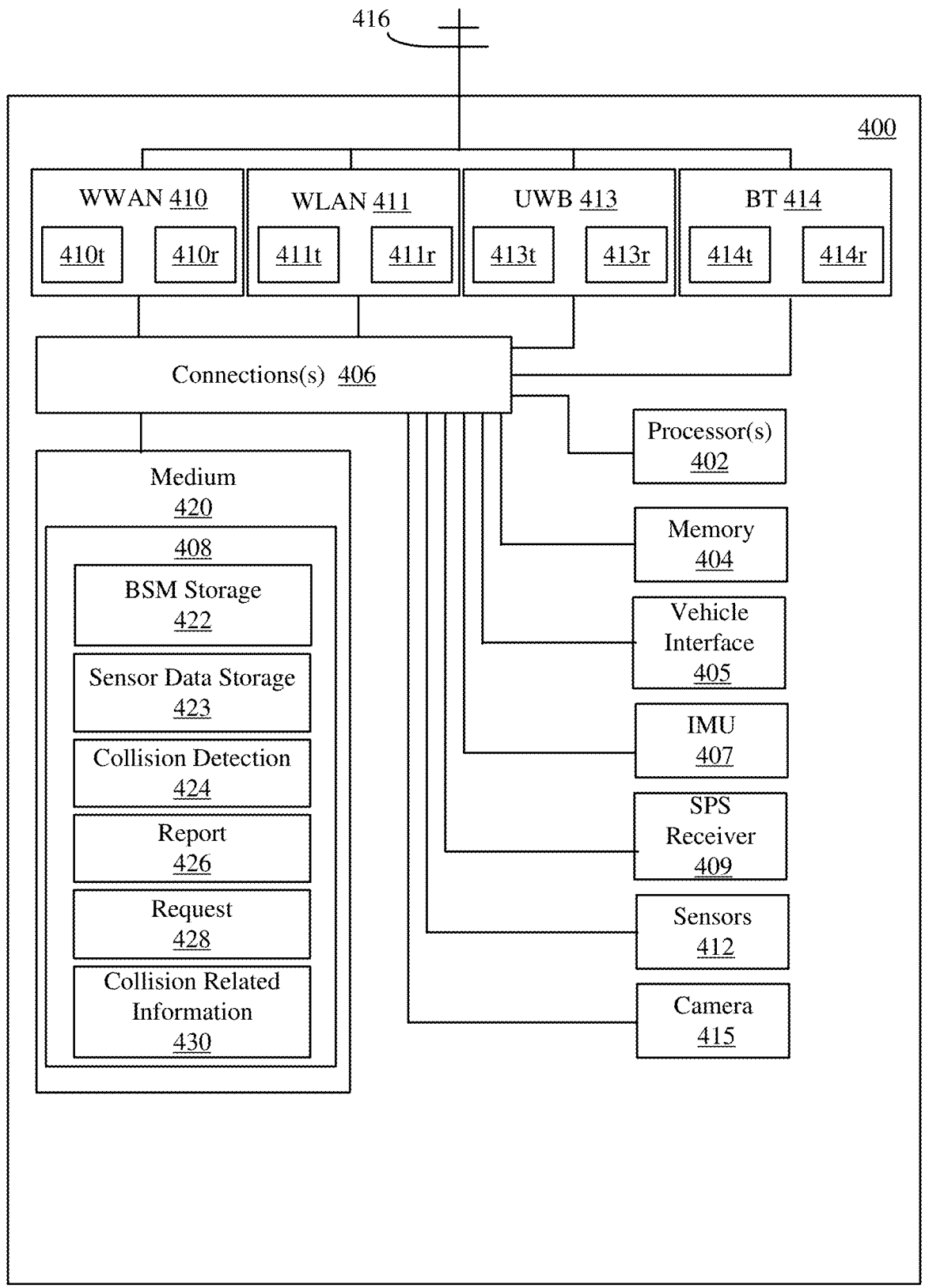
FIG. 4 shows a schematic block diagram illustrating certain exemplary features of a user equipment (UE), which may be configured to support communication of collision related information.

FIG. 4 shows a schematic block diagram illustrating certain exemplary features of a user equipment (UE) 400, which may be configured to support communication of collision related information, as described herein. The UE 400, for example, may serve as the OBU for vehicles 102, 104, 314, or 314 or RSU 110, 320 illustrated in FIGS. 1-3, and may be configured to perform the process illustrated in FIG. 3 and the process flows shown in FIGS. 5-8, and supporting algorithms described herein, including those discussed in reference to Tables 1-5.

The UE 400 may, for example, include one or more processors 402, memory 404, and one or more sensors. For example, if the UE 400 is used by a vehicle, such as, but not limited to a bicyclist or motorcyclist, the UE 400 may include a vehicle interface 405 with sensory input, including a wheel tick sensor, speed, acceleration, etc., that may be provided from the vehicle to UE 400. The UE 400 may include an inertial measurement unit (IMU) 407 that may include, e.g., an accelerometer, gyroscope, magnetometers, etc., which may be used to detect orientation with respect to a global or local reference frame, and the motion or one or more motion characteristics of the UE 400. The UE 400 may include a satellite positioning system (SPS) receiver 409 to receive SPS signals with which an approximate or absolute position may be determined. The UE 400 may further include one or more of sensors 412, such as range sensors (radar, lidar, ultrasound), impact sensors, pressure sensors, air bag sensors, etc., which may be used to detect a collision or accident. The UE 400 may further include a camera 415 to acquire optical data of the environment, with which object detection may be performed, e.g., to identify reference points, and ranging may be performed. Additionally, the UE 400 includes an external interface including, e.g., at least one of a Wireless Wide Area Network (WWAN) transceiver 410, a Wireless Local Area Network (WLAN) transceiver 411, an Ultra-Wideband (UWB) transceiver 413 and a Bluetooth transceiver 414. The one or more processors 402, the one or more sensors, external interface, may be operatively coupled with one or more connections 406 (e.g., buses, lines, fibers, links, etc.) to non-transitory computer readable medium 420 and memory 404. The UE 400 may further include additional items, which are not shown, such as a user interface that may include e.g., a display, a keypad or other input device, such as virtual keypad on the display, through which a user may interface with the user device. In certain example implementations, all or part of UE 400 may take the form of a chipset, and/or the like.

Transceiver 410 may be, e.g., a cellular transceiver, and may be configured to transmit and receive inter-vehicle communications, as illustrated in FIGS. 1 and 2. The transceiver 410 may include a transmitter 410t enabled to transmit one or more signals over one or more types of wireless communication links and a receiver 410r to receive one or more signals transmitted over the one or more types of wireless communication links. Transceiver 411 may be, e.g., a short-range transceiver, and may be configured to transmit and receive inter-vehicle communications wirelessly, as illustrated in FIGS. 1 and 2. The transceiver 411 may include a transmitter 411t enabled to transmit one or more signals over one or more types of wireless communication links and a receiver 411r to receive one or more signals transmitted over the one or more types of wireless communication links. Transceiver 413 may be, e.g., a UWB transceiver, and may be configured to transmit and receive inter-vehicle communications wirelessly, as illustrated in FIGS. 1 and 2. The transceiver 411 may include a transmitter 413t enabled to transmit one or more signals over one or more types of wireless communication links and a receiver 413r to receive one or more signals transmitted over the one or more types of wireless communication links. Transceiver 414 may be, e.g., a Bluetooth transceiver, and may be configured to transmit and receive inter-vehicle communications wirelessly, as illustrated in FIGS. 1 and 2. The transceiver 414 may include a transmitter 414t enabled to transmit one or more signals over one or more types of wireless communication links and a receiver 414r to receive one or more signals transmitted over the one or more types of wireless communication links. The transceivers 410, 411, 413, and 414 enable the UE 400 to communicate with network entities including other UEs using D2D communication links, such as DSRC, C-V2X, PC5, 5G NR, UWB, or Bluetooth.

In some embodiments, UE 400 may include antenna 416, which may be internal or external. The antenna 416 may be used to transmit and/or receive signals processed by any of transceivers 410, 411, 413, and 414. In some embodiments, antenna 416 may be coupled to any of transceivers 410, 411, 413, and 414. In some embodiments, measurements of signals received (transmitted) by UE 400 may be performed at the point of connection of the antenna 416 and any of transceivers 410, 411, 413, and 414. For example, the measurement point of reference for received (transmitted) RF signal measurements may be an input (output) terminal of the receivers 410r, 411r, 413r, 414r (transmitters 410t, 411t, 413t, 414t) and an output (input) terminal of the antenna 416. In a UE 400 with multiple antennas 416 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 400, e.g., based on the orientation of the UE 400 to the global or local reference frame as measured by the IMU 407.

The one or more processors 402 may be implemented using a combination of hardware, firmware, and software. For example, the one or more processors 402 may be configured to perform the functions discussed herein by implementing one or more instructions or program code 408 on a non-transitory computer readable medium, such as medium 420 and/or memory 404. In some embodiments, the one or more processors 402 may represent one or more circuits configurable to perform at least a portion of a data signal computing procedure or process related to the operation of UE 400.

The medium 420 and/or memory 404 may store instructions or program code 408 that contain executable code or software instructions that when executed by the one or more processors 402 cause the one or more processors 402 to operate as a special purpose computer programmed to perform the techniques disclosed herein. As illustrated in UE 400, the medium 420 and/or memory 404 may include one or more components or modules that may be implemented by the one or more processors 402 to perform the methodologies described herein. While the components or modules are illustrated as software in medium 420 that is executable by the one or more processors 402, it should be understood that the components or modules may be stored in memory 404 or may be dedicated hardware either in the one or more processors 402 or off the processors.

A number of software modules and data tables may reside in the medium 420 and/or memory 404 and be utilized by the one or more processors 402 in order to manage both communications and the functionality described herein. It should be appreciated that the organization of the contents of the medium 420 and/or memory 404 as shown in UE 400 is merely exemplary, and as such the functionality of the modules and/or data structures may be combined, separated, and/or be structured in different ways depending upon the implementation of the UE 400.

The medium 420 and/or memory 404 may include a BSM storage module 422 that when implemented by the one or more processors 402 configures the one or more processors 402 to temporarily store previous N seconds of basic safety messages (BSMs) on a continuing basis. The BSMs, for example, may be BSMs broadcast by the external interface, e.g., any of transceivers 410, 411, 413, or 414 or BMSs received from other OBUs via the external interface, e.g., any of transceivers 410, 411, 413, or 414. The BSMs may be stored to memory 404 or another dedicated memory unit. The one or more processors 402 are configured to store the BSMs for a configured number N of seconds before discarding the BSMs. The number N, for example, may be configurable, e.g., by the user, manufacturer, insurance company, etc., and may be variable based on various conditions, such as processing load or environmental or driving conditions, such as weather conditions, road conditions, road congestion, speed limit, speed of the vehicle, etc. After the detection of a collision, the one or more processors 402 may be configured to save the save the previous N seconds of the BSMs, e.g., for future access. For example, the previous N seconds of the BSMs may be saved to non-volatile memory (e.g., in memory 404), from which the BSMs may be accessed for reporting wirelessly or via a wired connection.

The medium 420 and/or memory 404 may include a sensor data storage module 423 that when implemented by the one or more processors 402 configures the one or more processors 402 to temporarily save a previous M seconds of sensor information on a continuing basis. The sensor data, for example, may be camera data from camera 415, or sensor data from sensors 412, such as radar data, lidar data, etc. The sensor data may further include data from the IMU 407, such as accelerometer data, gyroscope data, etc. The one or more processors 402 are configured to store the sensor data for a configured number M of seconds before discarding the sensor data. In some implementations, different types of sensor data may be stored for different amounts of time before being discarded. The number M, for example, may be configurable, e.g., by the user, manufacturer, insurance company, etc., and may be variable based on various conditions, such as processing load or environmental or driving conditions, such as weather conditions, road conditions, road congestion, speed limit, speed of the vehicle, etc. After the detection of a collision, the one or more processors 402 may be configured to save the save the previous M seconds of the sensor data, e.g., for future access. For example, the previous M seconds of the sensor data may be saved to non-volatile memory (e.g., in memory 404), from which the sensor data may be accessed for reporting wirelessly or via a wired connection.

The medium 420 and/or memory 404 may include a collision detection module 424 that when implemented by the one or more processors 402 configures the one or more processors 402 to detect a collision or accident of the vehicle. The collision or accident may be detected, e.g., using crash determination algorithms processing sensor fusion information from the camera 415 and other sensor data information, e.g., from sensors 412 and IMU 407, to detect specific collision criteria, such as sudden accelerations/decelerations due to a collision, sudden change in gravitational forces indicating a roll-over, etc. The one or more processors 402 may be configured to determine a collision has occurred based on information from multiple sources, including sensor information from impact sensors, pressure sensors, accelerometers, cameras, range sensors (radar, lidar, ultrasound), air bag sensor, etc. In some implementations, the one or more processors 402 may be configured to detect a collision of another vehicle, e.g., based on information from the camera 415 or sensors 412, such as range information from radar, lidar, ultrasound. For example, the one or more processors 402 may be configured to recognize a collision based camera data (or range information) indicating contact between a vehicle and another object or sudden acceleration/deceleration forces being applied to the vehicle.

The medium 420 and/or memory 404 may include a report module 426 that when implemented by the one or more processors 402 configures the one or more processors 402 to prepare and send a message to a server via the external interface, e.g., any of transceivers 410, 411, 413, or 414, that includes the previous N seconds of the BSMs, e.g., after the detection of the collision. The one or more processors 402 may be configured to prepare and send a message to a server via the external interface, e.g., any of transceivers 410, 411, 413, or 414, that includes the previous M seconds of sensor information, such as at least one of camera, radar, lidar, or a combination thereof, after the detection of a collision of the vehicle or after detection of another vehicle. The one or more processors 402 may be configured to prepare and send a message to other entities, such as other vehicles and RSUs, after the detection of a collision of another vehicle, the message indicating the collision has been detected and including the collision related information for the vehicle involved in the collision.

The medium 420 and/or memory 404 may include a request module 428 that when implemented by the one or more processors 402 configures the one or more processors 402 to generate and broadcast a message, via the external interface, e.g., any of transceivers 410, 411, 413, or 414, to other entities, e.g., other vehicles and RSUs, after the detection of a collision requesting that the other entities upload collision related information, or to receive such a message from another vehicle, via the external interface, e.g., any of transceivers 410, 411, 413, or 414. The requested collision related information, for example, may be one or more of BSMs received by the entity from the OBU, camera data, infrastructure related information, or a combination thereof. The one or more processors 402 may be configured to provide information (or receiving information) in the message, such as discussed in Tables 1-3, including one or more of a timestamp for the collision, a list of previous temporary IDs used by the OBU, a list of previous certificates used by the OBU, an identifier for the server to which the other entities are to upload the collision related information, or any combination thereof.

The medium 420 and/or memory 404 may include a collision related information module 430 that when implemented by the one or more processors 402 configures the one or more processors 402 to obtain collision related information for a collision of another vehicle, e.g., as detected by a request for collision related information received from another vehicle or by detecting a collision of another vehicle based on, e.g., camera or ranging, or other sensor information. The collision related information may be BSMs related to a host vehicle, e.g., the vehicle involved in the collision, or may be sensor information, including camera data, relevant to the collision. The collision related information, for example, may be obtained from camera/video images using computer vision techniques, including e.g., optical character recognition to recognize the license numbers. As discussed in Tables 4 and 5, the collision related information, for example, may include at least one identifier of the vehicle including a license plate number, a color, a make, a model, a confidence for each of the at least one identifier of the vehicle, a speed, acceleration, path, location, or any combination thereof, for the vehicle at a time when the collision of the vehicle was detected.

The methodologies described herein may be implemented by various means depending upon the application. For example, these methodologies may be implemented in hardware, firmware, software, or any combination thereof. For a hardware implementation, the one or more processors 402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 420 or memory 404 that is connected to and executed by the one or more processors 402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 408 on a non-transitory computer readable medium, such as medium 420 and/or memory 404. Examples include computer readable media encoded with a data structure and computer readable media encoded with a computer implemented program code 408. For example, the non-transitory computer readable medium including program code 408 stored thereon may include program code 408 to support communication of collision related information, in a manner consistent with disclosed embodiments. Non-transitory computer readable medium 420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 408 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 420, instructions and/or data may be provided as signals on transmission media included in a communication apparatus. For example, a communication apparatus may include the external interface, e.g., any of transceivers 410, 411, 413, or 414 having signals indicative of instructions and data. The instructions and data are configured to cause one or more processors to implement the functions outlined in the claims. That is, the communication apparatus includes transmission media with signals indicative of information to perform disclosed functions.

Memory 404 may represent any data storage mechanism. Memory 404 may include, for example, a primary memory and/or a secondary memory. Primary memory may include, for example, a random-access memory, read only memory, etc. While illustrated in this example as being separate from one or more processors 402, it should be understood that all or part of a primary memory may be provided within or otherwise co-located/coupled with the one or more processors 402. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 420. As such, in certain example implementations, the methods and/or apparatuses presented herein may take the form in whole or part of a computer readable medium 420 that may include computer implementable program code 408 stored thereon, which if executed by one or more processors 402 may be operatively enabled to perform all or portions of the example operations as described herein. Computer readable medium 420 may be a part of memory 404.

Figure 5:
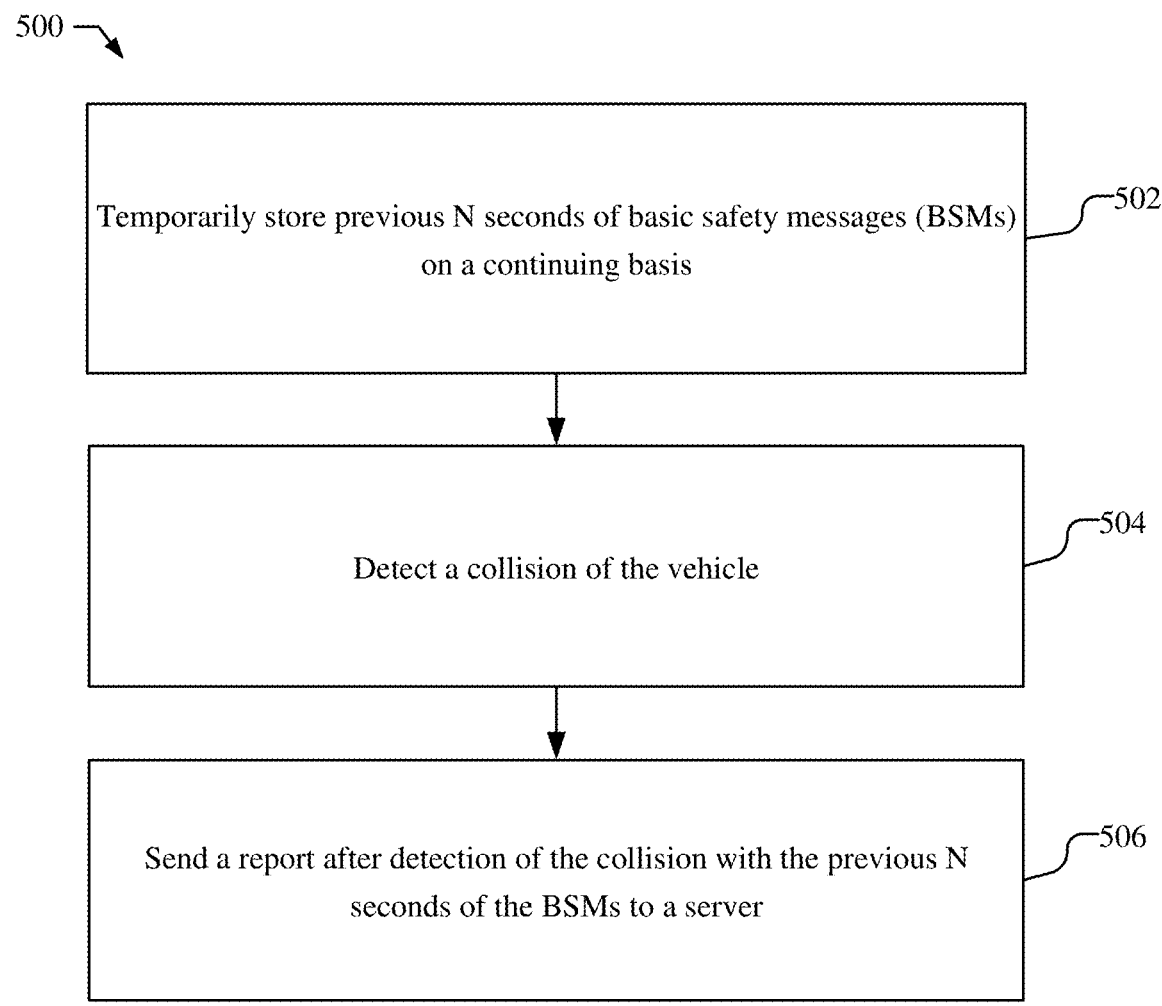
FIG. 5 is a flow chart illustrating a method of communicating collision related information performed by an On-Board Unit (OBU) for a vehicle.

FIG. 5 is a flow chart 500 illustrating a method of communicating collision related information performed by an On-Board Unit (OBU) for a vehicle, e.g., which may be vehicle 102 or 104 in FIGS. 1 and 2, and host vehicle 302 in FIG. 3, and the UE 400 in FIG. 4.

At block 502, the OBU temporarily stores previous N seconds of basic safety messages (BSMs) on a continuing basis, e.g., as discussed in FIG. 3. A means for temporarily storing previous N seconds of basic safety messages (BSMs) on a continuing basis may be, e.g., the external interface, e.g., any of transceivers 410, 411, 413, or 414, memory 404, and the one or more processors 402 with dedicated hardware or implementing executable code or software instructions in memory 404 and/or medium 420, such as the BSM storage module 422.

At block 504, the OBU detects a collision of the vehicle, e.g., as discussed at stage 1 in FIG. 3. A means for detecting a collision of the vehicle may be, e.g., the sensors 412, camera 415, and the one or more processors 402 with dedicated hardware or implementing executable code or software instructions in memory 404 and/or medium 420, such as the collision detection module 424.

At block 506, the OBU sends a report after detection of the collision with the previous N seconds of the BSMs to a server, such as server 220 in FIG. 2 or server 330 in FIG. 3, e.g., as discussed at stage 3 of FIG. 3. A means for sending a report after detection of the collision with the previous N seconds of the BSMs to a server may be, e.g., the external interface, e.g., any of transceivers 410, 411, 413, or 414, memory 404, and the one or more processors 402 with dedicated hardware or implementing executable code or software instructions in memory 404 and/or medium 420, such as the report module 426.

In some implementations, temporarily storing the previous N seconds of the BSMs on a continuing basis may be performed by the OBU by storing broadcast and received BSMs for N seconds in memory, and discarding the broadcast and received BSMs from the memory after N seconds, e.g., as discussed in FIG. 3. A means for storing broadcast and received BSMs for N seconds in memory may be, e.g., the memory 404, and the one or more processors 402 with dedicated hardware or implementing executable code or software instructions in memory 404 and/or medium 420, such as the BSM storage module 422. A means for discarding the broadcast and received BSMs from the memory after N seconds may be, e.g., the memory 404, and the one or more processors 402 with dedicated hardware or implementing executable code or software instructions in memory 404 and/or medium 420, such as the BSM storage module 422.

In some implementations, the OBU may detect the collision of the vehicle by at least one of detecting an impact of the vehicle, detecting a roll-over of the vehicle, detecting deployment of an air bag, or any combination thereof, e.g., as discussed at stage 1 of FIG. 3. A means for at least one of detecting an impact of the vehicle, detecting a roll-over of the vehicle, detecting deployment of an air bag, or any combination thereof may be, e.g., the sensors 412, camera 415, and the one or more processors 402 with dedicated hardware or implementing executable code or software instructions in memory 404 and/or medium 420, such as the collision detection module 424.

In some implementations, the OBU may save the previous N seconds of the BSMs after detection of the collision, e.g., for future access, e.g., as discussed at stage 2 of FIG. 3. A means for saving the previous N seconds of the BSMs after detection of the collision may be, e.g., the memory 404 and/or medium 420, and the one or more processors 402 with dedicated hardware or implementing executable code or software instructions in memory 404 and/or medium 420, such as the BSM storage module 422. In some implementations, saving the previous N seconds of the BSMs after detection of the collision comprises saving the previous N seconds of the BSMs to non-volatile memory, as discussed in stage 2 of FIG. 3. A means for saving the previous N seconds of the BSMs to non-volatile memory may be, e.g., the memory 404, and the one or more processors 402 with dedicated hardware or implementing executable code or software instructions in memory 404 and/or medium 420, such as the BSM storage module 422.

In some implementation, the OBU may further temporarily store a previous M seconds of sensor information on a continuing basis, wherein the report to the server after detection of the collision includes the previous M seconds of sensor information, e.g., as discussed in stages 2 and 3 of FIG. 3. For example, the sensor information may include at least one of camera, radar, lidar, or a combination thereof. A means for temporarily storing a previous M seconds of sensor information on a continuing basis, wherein the report to the server after detection of the collision includes the previous M seconds of sensor information may be, e.g., the sensors 412, camera 415, the memory 404 and/or medium 420, and the one or more processors 402 with dedicated hardware or implementing executable code or software instructions in memory 404 and/or medium 420, such as the sensor data storage module 423 and the report module 426.

In some implementations, the OBU may further broadcast a message to other entities after the detection of the collision requesting that the other entities upload collision related information, e.g., as discussed at stage 4 of FIG. 3 and Tables 1-3. For example, the collision related information from each entity may include one or more of BSMs received by the entity from the OBU, camera data, infrastructure related information, or a combination thereof, e.g., as discussed in stages 4, 5, and 6 of FIG. 3. In one example, the message to the other entities may include at least one of a timestamp for the collision, a list of previous temporary IDs used by the OBU, a list of previous certificates used by the OBU, or any combination thereof, e.g., as discussed in stage 4 of FIG. 3 and Tables 2 and 3. In some implementations, the message to the other entities may include an identifier for the server to which the other entities are to upload the collision related information, e.g., as discussed at stage 4 in FIG. 3. A means for broadcasting a message to other entities after the detection of the collision requesting that the other entities upload collision related information may be, e.g., the external interface, e.g., any of transceivers 410, 411, 413, or 414, memory 404, and the one or more processors 402 with dedicated hardware or implementing executable code or software instructions in memory 404 and/or medium 420, such as the request module 428.

Figure 6:
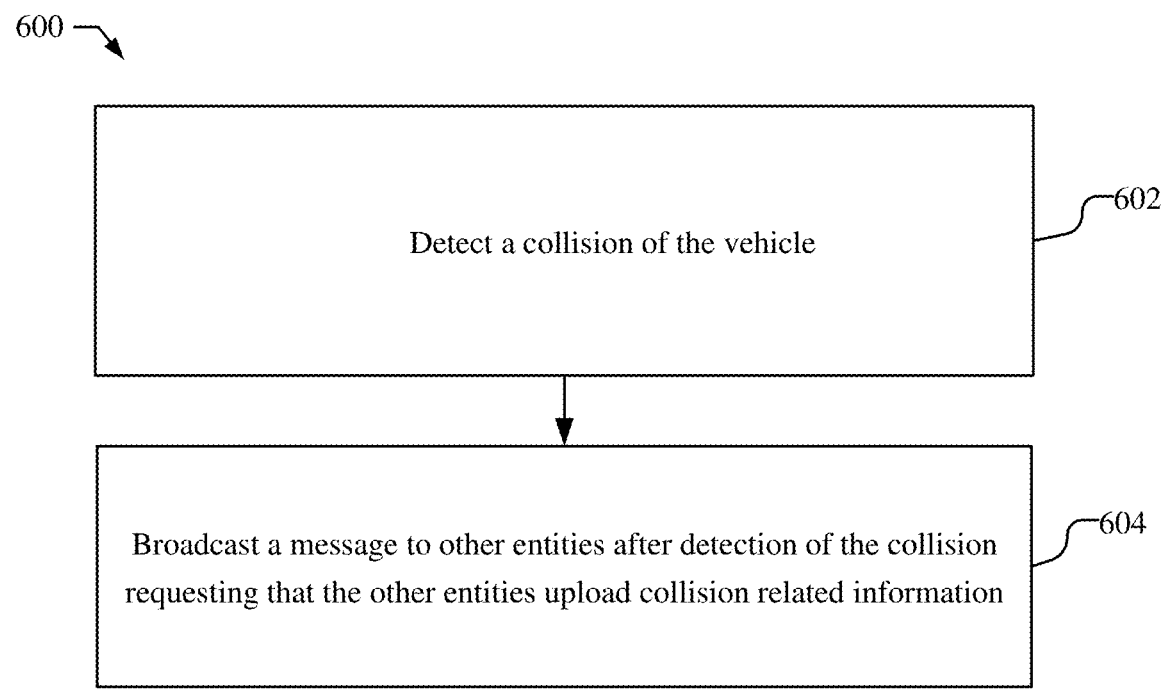
FIG. 6 is a flow chart illustrating a method of communicating collision related information performed by an OBU for a vehicle.

FIG. 6 is a flow chart 600 illustrating a method of communicating collision related information performed by an On-Board Unit (OBU) for a vehicle, e.g., which may be vehicle 102 or 104 in FIGS. 1 and 2, and host vehicle 302 in FIG. 3, and the UE 400 in FIG. 4.

At block 602, the OBU detecting a collision of the vehicle, e.g., as discussed at stage 1 in FIG. 3. A means for detecting a collision of the vehicle may be, e.g., the sensors 412, camera 415, and the one or more processors 402 with dedicated hardware or implementing executable code or software instructions in memory 404 and/or medium 420, such as the collision detection module 424.

At block 604, the OBU broadcasts a message to other entities after the detection of the collision requesting that the other entities upload collision related information, e.g., as discussed at stage 4 of FIG. 3 and Tables 1-3. For example, the collision related information from each entity may include one or more of BSMs received by the entity from the OBU, camera data, infrastructure related information, or a combination thereof, e.g., as discussed in stages 4, 5, and 6 of FIG. 3. In one example, the message to the other entities may include at least one of a timestamp for the collision, a list of previous temporary IDs used by the OBU, a list of previous certificates used by the OBU, or any combination thereof, e.g., as discussed in stage 4 of FIG. 3 and Tables 2 and 3. In some implementations, the message to the other entities may include an identifier for the server to which the other entities are to upload the collision related information, e.g., as discussed at stage 4 in FIG. 3. A means for broadcasting a message to other entities after the detection of the collision requesting that the other entities upload collision related information may be, e.g., the external interface, e.g., any of transceivers 410, 411, 413, or 414, and the one or more processors 402 with dedicated hardware or implementing executable code or software instructions in memory 404 and/or medium 420, such as the request module 428.

In some implementations, the OBU may detect the collision of the vehicle by at least one of detecting an impact of the vehicle, detecting a roll-over of the vehicle, detecting deployment of an air bag, or any combination thereof, e.g., as discussed at stage 1 of FIG. 3. A means for at least one of detecting an impact of the vehicle, detecting a roll-over of the vehicle, detecting deployment of an air bag, or any combination thereof may be, e.g., the sensors 412, camera 415, and the one or more processors 402 with dedicated hardware or implementing executable code or software instructions in memory 404 and/or medium 420, such as the collision detection module 424.

Figure 7:
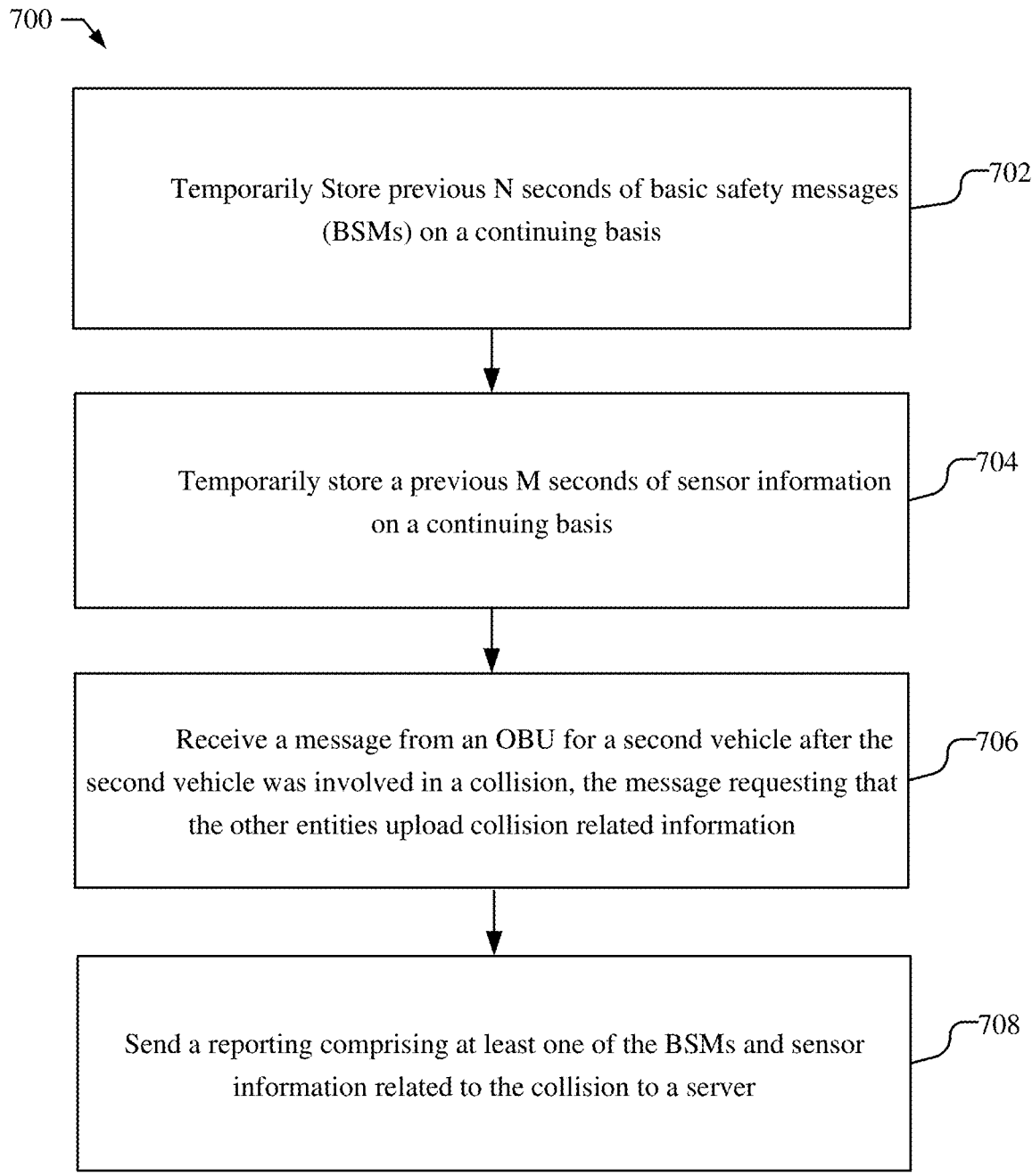
FIG. 7 is a flow chart illustrating a method of communicating collision related information performed by an OBU for a vehicle.

FIG. 7 is a flow chart 700 illustrating a method of communicating collision related information performed by an On-Board Unit (OBU) for a vehicle, e.g., which may be vehicle 102 or 104 in FIGS. 1 and 2, and remote vehicle 316 in FIG. 3, and the UE 400 in FIG. 4.

At block 702, the OBU temporarily storing previous N seconds of basic safety messages (BSMs) on a continuing basis, e.g., as discussed in FIG. 3. A means for temporarily storing previous N seconds of basic safety messages (BSMs) on a continuing basis may be, e.g., the external interface, e.g., any of transceivers 410, 411, 413, or 414, memory 404, and the one or more processors 402 with dedicated hardware or implementing executable code or software instructions in memory 404 and/or medium 420, such as the BSM storage module 422.

At block 704, the OBU temporarily stores a previous M seconds of sensor information on a continuing basis, e.g., as discussed in stages 2 and 3 of FIG. 3. For example, the sensor information may include at least one of camera, radar, lidar, or a combination thereof. For example, the sensor information may include at least one of camera, radar, lidar, or a combination thereof. A means for temporarily storing a previous M seconds of sensor information on a continuing basis may be, e.g., the sensors 412, camera 415, the memory 404 and/or medium 420, and the one or more processors 402 with dedicated hardware or implementing executable code or software instructions in memory 404 and/or medium 420, such as the sensor data storage module 423.

At block 706, the OBU receives a message from an OBU for a second vehicle after the second vehicle was involved in a collision, the message requesting that the other entities upload collision related information, e.g., as discussed at stage 4 of FIG. 3 and Tables 1-3. In some implementations, the collision related information from each entity may be one or more of basic safety messages (BSMs) received by the entity from the OBU, camera data related to the collision, or a combination thereof, e.g., as discussed in stages 4 and 5 of FIG. 3. In some implementations, the message received from the OBU for the second vehicle comprises at least one of a timestamp for the collision, a list of previous temporary IDs used by the OBU for the second vehicle, a list of previous certificates used by the OBU for the second vehicle, or any combination thereof, e.g., as discussed in stage 4 of FIG. 3 and Tables 2 and 3. In some implementations, the message received from the OBU for the second vehicle comprises an identifier for the server to which the report is be sent, e.g., as discussed at stage 4 in FIG. 3. A means for receiving a message from an OBU for a second vehicle after the second vehicle was involved in a collision, the message requesting that the other entities upload collision related information may be, e.g., the external interface, e.g., any of transceivers 410, 411, 413, or 414, memory 404, and the one or more processors 402 with dedicated hardware or implementing executable code or software instructions in memory 404 and/or medium 420, such as the request module 428.

At block 708, the OBU sends a report comprising at least one of the BSMs and sensor information related to the collision to a server, e.g., as discussed at stage 5 of FIG. 3. A means for sending a report comprising at least one of the BSMs and sensor information related to the collision to a server may be, e.g., the external interface, e.g., any of transceivers 410, 411, 413, or 414, memory 404, and the one or more processors 402 with dedicated hardware or implementing executable code or software instructions in memory 404 and/or medium 420, such as the report module 426.

In some implementations, temporarily storing the previous N seconds of the BSMs on a continuing basis may be performed by the OBU by storing broadcast and received BSMs for N seconds in memory, and discarding the broadcast and received BSMs from the memory after N seconds, e.g., as discussed in FIG. 3. A means for storing broadcast and received BSMs for N seconds in memory may be, e.g., the memory 404, and the one or more processors 402 with dedicated hardware or implementing executable code or software instructions in memory 404 and/or medium 420, such as the BSM storage module 422. A means for discarding the broadcast and received BSMs from the memory after N seconds may be, e.g., the memory 404, and the one or more processors 402 with dedicated hardware or implementing executable code or software instructions in memory 404 and/or medium 420, such as the BSM storage module 422.

Figure 8:
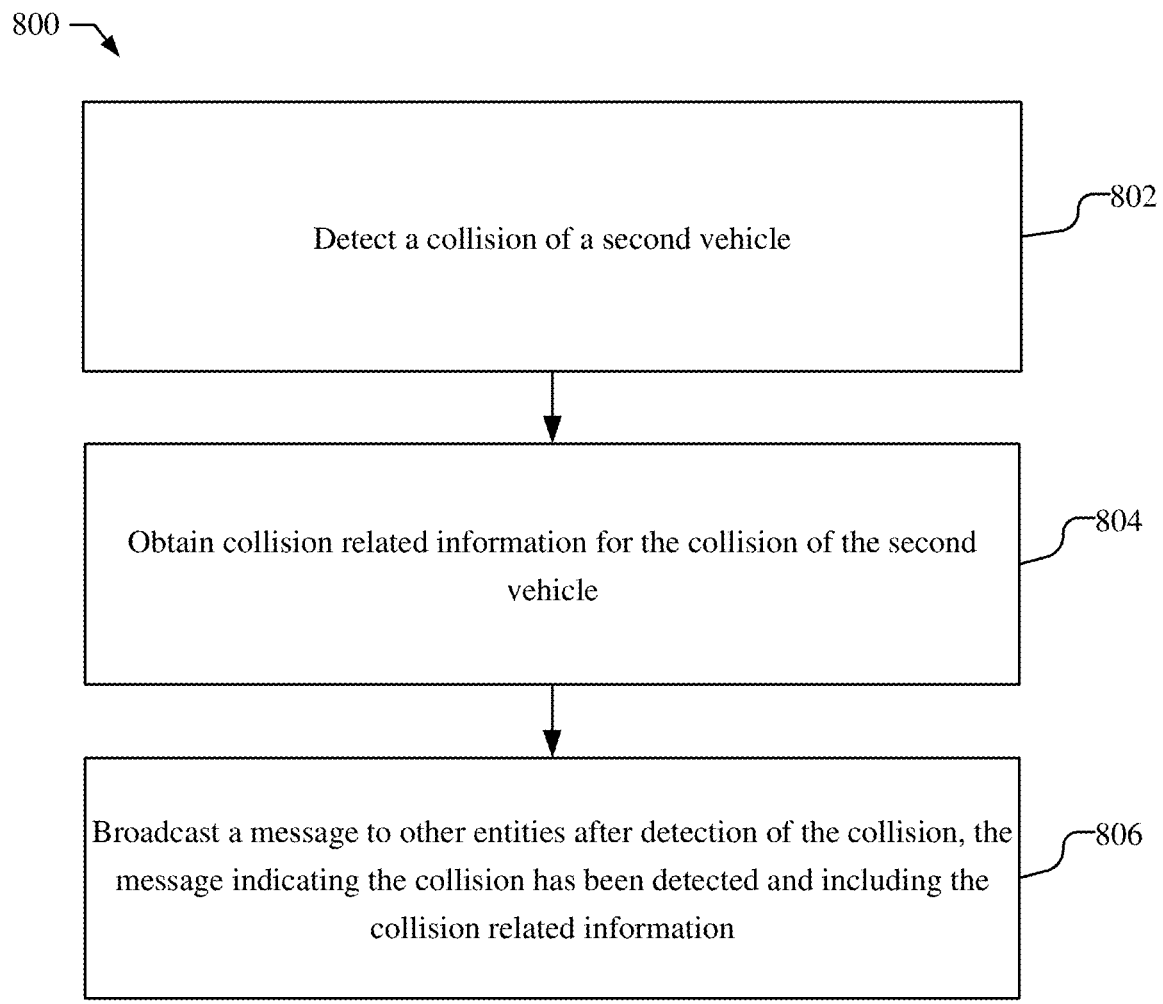
FIG. 8 is a flow chart illustrating a method of communicating collision related information performed by an OBU for a vehicle.

FIG. 8 is a flow chart 800 illustrating a method of communicating collision related information performed by an On-Board Unit (OBU) for a vehicle, e.g., which may be vehicle 102 or 104 in FIGS. 1 and 2, and remote vehicle 314 in FIG. 3, and the UE 400 in FIG. 4.

At block 802, the OBU detects a collision of a second vehicle, such as the host vehicle 302, e.g., as discussed at stage 7 of FIG. 3. By way of example, the collision may be detected based on camera data. A means for detecting a collision of a second vehicle may be, e.g., the external interface, e.g., any of transceivers 410, 411, 413, or 414, the sensors 412, camera 415, and the one or more processors 402 with dedicated hardware or implementing executable code or software instructions in memory 404 and/or medium 420, such as the collision detection module 424.

At block 804, the OBU obtains collision related information for the collision of the second vehicle, e.g., as discussed in stage 7 and 8 of FIG. 3. A means for obtaining collision related information for the collision of the second vehicle may be, e.g., the external interface, e.g., any of transceivers 410, 411, 413, or 414, the memory 404, the sensors 412, camera 415, and the one or more processors 402 with dedicated hardware or implementing executable code or software instructions in memory 404 and/or medium 420, such as the collision related information module 430.

At stage 806, the OBU may broadcast a message to other entities after the detection of the collision, the message indicating the collision has been detected and including the collision related information, e.g., as discussed at stage 8 of FIG. 3 and Tables 4 and 5. A means for broadcasting a message to other entities after the detection of the collision, the message indicating the collision has been detected and including the collision related information may be, e.g., the external interface, e.g., any of transceivers 410, 411, 413, or 414, memory 404, and the one or more processors 402 with dedicated hardware or implementing executable code or software instructions in memory 404 and/or medium 420, such as the report module 426.

In some implementations, the collision related information, for example, may include at least one identifier of the second vehicle, e.g., as discussed in stage 8 of FIG. 3 and Tables 4 and 5. For example, the at least one identifier of the second vehicle comprises a license plate number, a color, a make, a model, or any combination thereof, e.g., as discussed in stage 8 of FIG. 3 and Tables 4 and 5. The collision related information may further include a confidence for each of the at least one identifier of the second vehicle, e.g., as discussed in Table 5. In some implementations, the collision related information may include at least one of a speed, acceleration, path, location, or any combination thereof for the second vehicle at a time when the collision of the second vehicle was detected, e.g., as discussed in stage 8 of FIG. 3 and Tables 4 and 5.

In some implementations, the OBU may send a report comprising sensor information related to the collision of the second vehicle to a server, e.g., as discussed at stage 9 of FIG. 3. The sensor information, for example, may include at least one of camera, radar, lidar, or a combination thereof, e.g., as discussed at stage 9 of FIG. 3. A means for sending a report comprising sensor information related to the collision of the second vehicle to a server may be, e.g., the external interface, e.g., any of transceivers 410, 411, 413, or 414, memory 404, and the one or more processors 402 with dedicated hardware or implementing executable code or software instructions in memory 404 and/or medium 420, such as the report module 426.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by an On-Board Unit (OBU) for a vehicle for communicating collision related information, the method comprising: temporarily storing previous N seconds of basic safety messages (BSMs) on a continuing basis; detecting a collision of the vehicle; and sending a report after detection of the collision with the previous N seconds of the BSMs to a server.

Clause 2. The method of clause 1, wherein temporarily storing the previous N seconds of the BSMs on a continuing basis comprises: storing broadcast BSMs and received BSMs for N seconds in memory; and discarding the broadcast BSMs and received BSMs from the memory after N seconds.

Clause 3. The method of any of clauses 1-2, wherein detecting the collision of the vehicle comprises at least one of detecting an impact of the vehicle, detecting a roll-over of the vehicle, detecting deployment of an air bag, or any combination thereof.

Clause 4. The method of any of clauses 1-3, further comprising temporarily storing a previous M seconds of sensor information on a continuing basis, wherein the report to the server after detection of the collision includes the previous M seconds of sensor information.

Clause 5. The method of clause 4, the sensor information comprises at least one of camera, radar, lidar, or a combination thereof.

Clause 6. The method of any of clauses 1-5, further comprising broadcasting a message to other entities after detection of the collision requesting that the other entities upload collision related information.

Clause 7. The method of clause 6, wherein the collision related information from each entity comprises one or more of BSMs received by the entity from the OBU, camera data, infrastructure related information, or a combination thereof.

Clause 8. The method of clause 6, wherein the message to the other entities comprises at least one of a timestamp for the collision, a list of previous temporary IDs used by the OBU, a list of previous certificates used by the OBU, or any combination thereof.

Clause 9. The method of clause 8, wherein the message to the other entities further comprises an identifier for the server to which the other entities are to upload the collision related information.

Clause 10. An On-Board Unit (OBU) for a vehicle configured for communicating collision related information, comprising: at least one wireless transceiver configured to wirelessly communicate with network entities; one or more sensors, at least one memory; and at least one processor coupled to the wireless transceiver, the one or more sensors, and the at least one memory, the at least one processor configured to: temporarily store previous N seconds of basic safety messages (BSMs) on a continuing basis; detect, via the one or more sensors, a collision of the vehicle; and send, via the at least one wireless transceiver, a report after detection of the collision with the previous N seconds of the BSMs to a server.

Clause 11. The OBU of clause 10, wherein the at least one processor is configured to temporarily store the previous N seconds of the BSMs on a continuing basis by being configured to: store broadcast BSMs and received BSMs for N seconds in memory; and discard the broadcast BSMs and received BSMs from the memory after N seconds.

Clause 12. The OBU of any of clauses 10-11, wherein the at least one processor is configured to detect the collision of the vehicle by being configured to at least one of detect an impact of the vehicle, detect a roll-over of the vehicle, detect deployment of an air bag, or any combination thereof.

Clause 13. The OBU of any of clauses 10-12, wherein the at least one processor is further configured to temporarily store a previous M seconds of sensor information from the one or more sensors on a continuing basis, wherein the report to the server after detection of the collision includes the previous M seconds of sensor information.

Clause 14. The OBU of clause 13, the sensor information comprises at least one of camera, radar, lidar, or a combination thereof.

Clause 15. The OBU of any of clauses 10-14, wherein the at least one processor is further configured to broadcast, via the at least one wireless transceiver, a message to other entities after detection of the collision requesting that the other entities upload collision related information.

Clause 16. The OBU of clause 15, wherein the collision related information from each entity comprises one or more of BSMs received by the entity from the OBU, camera data, infrastructure related information, or a combination thereof.

Clause 17. The OBU of clause 15, wherein the message to the other entities comprises at least one of a timestamp for the collision, a list of previous temporary IDs used by the OBU, a list of previous certificates used by the OBU, or any combination thereof.

Clause 18. The OBU of clause 17, wherein the message to the other entities further comprises an identifier for the server to which the other entities are to upload the collision related information.

Clause 19. An On-Board Unit (OBU) for a vehicle configured for communicating collision related information, comprising: means for temporarily storing previous N seconds of basic safety messages (BSMs) on a continuing basis; means for detecting a collision of the vehicle; and means for sending a report after detection of the collision with the previous N seconds of the BSMs to a server.

Clause 20. A non-transitory storage medium including program code stored thereon, the program code is operable to configure at least one processor in an On-Board Unit (OBU) for a vehicle for communicating collision related information, the program code comprising instructions to: temporarily store previous N seconds of basic safety messages (BSMs) on a continuing basis; detect a collision of the vehicle; and send a report after detection of the collision with the previous N seconds of the BSMs to a server.

Clause 21. A method performed by an On-Board Unit (OBU) for a vehicle for communicating collision related information, the method comprising: detecting a collision of the vehicle; and broadcasting a message to other entities after detection of the collision requesting that the other entities upload collision related information.

Clause 22. The method of clause 21, wherein detecting the collision of the vehicle comprises at least one of detecting an impact of the vehicle, detecting a roll-over of the vehicle, detecting deployment of an air bag, or any combination thereof.

Clause 23. The method of any of clauses 21-22, wherein the collision related information from each entity comprises one or more of basic safety messages (BSMs) received by the entity from the OBU, camera data, infrastructure related information, or a combination thereof.

Clause 24. The method of any of clauses 21-23, wherein the message to the other entities comprises at least one of a timestamp for the collision, a list of previous temporary IDs used by the OBU, a list of previous certificates used by the OBU, or any combination thereof.

Clause 25. The method of any of clauses 21-24, wherein the message to the other entities further comprises an identifier for a server to which the other entities are to upload the collision related information.

Clause 26. An On-Board Unit (OBU) for a vehicle configured for communicating collision related information, comprising: at least one wireless transceiver configured to wirelessly communicate with network entities; one or more sensors, at least one memory; and at least one processor coupled to the wireless transceiver, the one or more sensors, and the at least one memory, the at least one processor configured to: detect, via the one or more sensors, a collision of the vehicle; and broadcast, via the at least one wireless transceiver, a message to other entities after detection of the collision requesting that the other entities upload collision related information.

Clause 27. The OBU of clause 26, wherein the at least one processor is configured to detect the collision of the vehicle by being configured to at least one of detect an impact of the vehicle, detect a roll-over of the vehicle, detect deployment of an air bag, or any combination thereof.

Clause 28. The OBU of any of clauses 26-27, wherein the collision related information from each entity comprises one or more of basic safety messages (BSMs) received by the entity from the OBU, camera data, infrastructure related information, or a combination thereof.

Clause 29. The OBU of any of clauses 26-28, wherein the message to the other entities comprises at least one of a timestamp for the collision, a list of previous temporary IDs used by the OBU, a list of previous certificates used by the OBU, or any combination thereof.

Clause 30. The OBU of any of clauses 26-29, wherein the message to the other entities further comprises an identifier for a server to which the other entities are to upload the collision related information.

Clause 31. An On-Board Unit (OBU) for a vehicle configured for communicating collision related information, comprising: means for detecting a collision of the vehicle; and means for broadcasting a message to other entities after detection of the collision requesting that the other entities upload collision related information.

Clause 32. A non-transitory storage medium including program code stored thereon, the program code is operable to configure at least one processor in an On-Board Unit (OBU) for a vehicle for communicating collision related information, the program code comprising instructions to: detect a collision of the vehicle; and broadcast a message to other entities after detection of the collision requesting that the other entities upload collision related information.

Clause 33. A method performed by an On-Board Unit (OBU) for a vehicle for communicating collision related information, the method comprising: temporarily storing previous N seconds of basic safety messages (BSMs) on a continuing basis; temporarily storing a previous M seconds of sensor information on a continuing basis; receiving a message from an OBU for a second vehicle after the second vehicle was involved in a collision, the message requesting that the other entities upload collision related information; and sending a report comprising at least one of the BSMs and sensor information related to the collision to a server.

Clause 34. The method of clause 33, wherein temporarily storing the previous N seconds of the BSMs on a continuing basis comprises: storing broadcast and received BSMs for N seconds in memory; and discarding the broadcast and received BSMs from the memory after N seconds.

Clause 35. The method of any of clauses 33-34, the sensor information comprises at least one of camera, radar, lidar, or a combination thereof.

Clause 36. The method of any of clauses 33-35, wherein the collision related information from each entity comprises one or more of basic safety messages (BSMs) received by the entity from the OBU, camera data related to the collision, or a combination thereof.

Clause 37. The method of any of clauses 33-36, wherein the message received from the OBU for the second vehicle comprises at least one of a timestamp for the collision, a list of previous temporary IDs used by the OBU for the second vehicle, a list of previous certificates used by the OBU for the second vehicle, or any combination thereof.

Clause 38. The method of any of clauses 33-37, wherein the message received from the OBU for the second vehicle comprises an identifier for the server to which the report is be sent.

Clause 39. An On-Board Unit (OBU) for a vehicle configured for communicating collision related information, comprising: at least one wireless transceiver configured to wirelessly communicate with network entities; one or more sensors, at least one memory; and at least one processor coupled to the wireless transceiver, the one or more sensors, and the at least one memory, the at least one processor configured to: temporarily store previous N seconds of basic safety messages (BSMs) on a continuing basis; temporarily store a previous M seconds of sensor information from the one or more sensors on a continuing basis; receive, via the at least one wireless transceiver, a message from an OBU for a second vehicle after the second vehicle was involved in a collision, the message requesting that the other entities upload collision related information; and send, via the at least one wireless transceiver, a report comprising at least one of the BSMs and sensor information related to the collision to a server.

Clause 40. The OBU of clause 39, wherein the at least one processor is configured to temporarily store the previous N seconds of the BSMs on a continuing basis by being configured to: store broadcast and received BSMs for N seconds in memory; and discard the broadcast and received BSMs from the memory after N seconds.

Clause 41. The OBU of any of clauses 39-40, the sensor information comprises at least one of camera, radar, lidar, or a combination thereof.

Clause 42. The OBU of any of clauses 39-41, wherein the collision related information from each entity comprises one or more of basic safety messages (BSMs) received by the entity from the OBU, camera data related to the collision, or a combination thereof.

Clause 43. The OBU of any of clauses 39-42, wherein the message received from the OBU for the second vehicle comprises at least one of a timestamp for the collision, a list of previous temporary IDs used by the OBU for the second vehicle, a list of previous certificates used by the OBU for the second vehicle, or any combination thereof.

Clause 44. The OBU of any of clauses 39-43, wherein the message received from the OBU for the second vehicle comprises an identifier for the server to which the report is be sent.

Clause 45. An On-Board Unit (OBU) for a vehicle configured for communicating collision related information, comprising: means for temporarily storing previous N seconds of basic safety messages (BSMs) on a continuing basis;

means for temporarily storing a previous M seconds of sensor information on a continuing basis; means for receiving a message from an OBU for a second vehicle after the second vehicle was involved in a collision, the message requesting that the other entities upload collision related information; and means for sending a report comprising at least one of the BSMs and sensor information related to the collision to a server.

Clause 46. A non-transitory storage medium including program code stored thereon, the program code is operable to configure at least one processor in an On-Board Unit (OBU) for a vehicle for communicating collision related information, the program code comprising instructions to: temporarily store previous N seconds of basic safety messages (BSMs) on a continuing basis; temporarily store a previous M seconds of sensor information on a continuing basis; receive a message from an OBU for a second vehicle after the second vehicle was involved in a collision, the message requesting that the other entities upload collision related information; and send a report comprising at least one of the BSMs and sensor information related to the collision to a server.

Clause 47. A method performed by an On-Board Unit (OBU) for a vehicle for communicating collision related information, the method comprising: detecting a collision of a second vehicle; obtaining collision related information for the collision of the second vehicle; and broadcasting a message to other entities after detection of the collision, the message indicating the collision has been detected and including the collision related information.

Clause 48. The method of clause 47, wherein the collision is detected based on camera data.

Clause 49. The method of any of clauses 47-48, wherein the collision related information comprises at least one identifier of the second vehicle.

Clause 50. The method of clause 49, wherein the at least one identifier of the second vehicle comprises a license plate number, a color, a make, a model, or any combination thereof.

Clause 51. The method of clause 49, wherein the collision related information further comprises a confidence for each of the at least one identifier of the second vehicle.

Clause 52. The method of any of clauses 47-51, wherein the collision related information comprises at least one of a speed, acceleration, path, location, or any combination thereof for the second vehicle at a time when the collision of the second vehicle was detected.

Clause 53. The method of any of clauses 47-52, further comprising sending a report comprising sensor information related to the collision of the second vehicle to a server.

Clause 54. The method of clause 53, wherein the sensor information comprises at least one of camera, radar, lidar, or a combination thereof.

Clause 55. An On-Board Unit (OBU) for a vehicle configured for communicating collision related information, comprising: at least one wireless transceiver configured to wirelessly communicate with network entities; one or more sensors, at least one memory; and at least one processor coupled to the wireless transceiver, the one or more sensors, and the at least one memory, the at least one processor configured to: detect, via the one or more sensors, a collision of a second vehicle; obtain collision related information for the collision of the second vehicle; and broadcast, via the at least one wireless transceiver, a message to other entities after detection of the collision, the message indicating the collision has been detected and including the collision related information.

Clause 56. The OBU of clause 55, wherein the collision is detected based on camera data.

Clause 57. The OBU of any of clauses 55-56, wherein the collision related information comprises at least one identifier of the second vehicle.

Clause 58. The OBU of clause 59, wherein the at least one identifier of the second vehicle comprises a license plate number, a color, a make, a model, or any combination thereof.

Clause 59. The OBU of clause 59, wherein the collision related information further comprises a confidence for each of the at least one identifier of the second vehicle.

Clause 60. The OBU of any of clauses 55-59, wherein the collision related information comprises at least one of a speed, acceleration, path, location, or any combination thereof for the second vehicle at a time when the collision of the second vehicle was detected.

Clause 61. The OBU of any of clauses 55-60, wherein the at least one processor is further configured to send, via the at least one wireless transceiver, a report comprising sensor information related to the collision of the second vehicle to a server.

Clause 62. The OBU of clause 61, wherein the sensor information comprises at least one of camera, radar, lidar, or a combination thereof.

Clause 63. An On-Board Unit (OBU) for a vehicle configured for communicating collision related information, comprising: means for detecting a collision of a second vehicle; means for obtaining collision related information for the collision of the second vehicle; and means for broadcasting a message to other entities after detection of the collision, the message indicating the collision has been detected and including the collision related information.

Clause 64. A non-transitory storage medium including program code stored thereon, the program code is operable to configure at least one processor in an On-Board Unit (OBU) for a vehicle for communicating collision related information, the program code comprising instructions to: detect a collision of a second vehicle; obtain collision related information for the collision of the second vehicle; and broadcast a message to other entities after detection of the collision, the message indicating the collision has been detected and including the collision related information.

Therefore, it is intended that claimed subject matter not be limited to the particular examples disclosed, but that such claimed subject matter may also include all aspects falling within the scope of appended claims, and equivalents thereof.

What is claimed is:

1. A method performed by an On-Board Unit (OBU) for a vehicle for communicating collision related information, the method comprising:
   temporarily storing previous N seconds of basic safety messages (BSMs) on a continuing basis;
   detecting a collision of the vehicle;
   broadcasting a message to other entities after detection of the collision requesting that the other entities upload collision related information, wherein the message includes a timestamp for the collision, a list of previous temporary IDs used by the OBU in the previous N seconds, and a list of previous certificates used by the OBU in the previous N seconds; and
   sending a report after detection of the collision with the previous N seconds of the BSMs, the timestamp for the collision, the list of previous temporary IDs used by the OBU in the previous N seconds, and the list of previous certificates used by the OBU to a server.

2. The method of claim 1, wherein temporarily storing the previous N seconds of the BSMs on a continuing basis comprises:
   storing broadcast BSMs and received BSMs for N seconds in memory; and
   discarding the broadcast BSMs and received BSMs from the memory after N seconds.

3. The method of claim 1, wherein detecting the collision of the vehicle comprises at least one of detecting an impact of the vehicle, detecting a roll-over of the vehicle, detecting deployment of an air bag, or any combination thereof.

4. The method of claim 1, further comprising temporarily storing a previous M seconds of sensor information on a continuing basis, wherein the report to the server after detection of the collision includes the previous M seconds of sensor information.

5. The method of claim 4, the sensor information comprises at least one of camera, radar, lidar, or a combination thereof.

6. The method of claim 1, wherein the collision related information from each entity comprises one or more of BSMs received by the entity from the OBU, camera data, infrastructure related information, or a combination thereof.

7. The method of claim 1, wherein the message to the other entities further comprises an identifier for the server to which the other entities are to upload the collision related information.

8. An On-Board Unit (OBU) for a vehicle configured for communicating collision related information, comprising:
   at least one wireless transceiver configured to wirelessly communicate with network entities;
   one or more sensors,
   at least one memory; and
   at least one processor coupled to the wireless transceiver, the one or more sensors, and the at least one memory, the at least one processor configured to:
   temporarily store previous N seconds of basic safety messages (BSMs) on a continuing basis;
   detect, via the one or more sensors, a collision of the vehicle;
   broadcast a message to other entities after detection of the collision requesting that the other entities upload collision related information, wherein the message includes a timestamp for the collision, a list of previous temporary IDs used by the OBU in the previous N seconds, and a list of previous certificates used by the OBU in the previous N seconds; and
   send, via the at least one wireless transceiver, a report after detection of the collision with the previous N seconds of the BSMs, the timestamp for the collision, the list of previous temporary IDs used by the OBU in the previous N seconds, and the list of previous certificates used by the OBU to a server.

9. The OBU of claim 8, wherein the at least one processor is configured to temporarily store the previous N seconds of the BSMs on a continuing basis by being configured to:
   store broadcast BSMs and received BSMs for N seconds in memory; and
   discard the broadcast BSMs and received BSMs from the memory after N seconds.

10. The OBU of claim 8, wherein the at least one processor is configured to detect the collision of the vehicle by being configured to at least one of detect an impact of the vehicle, detect a roll-over of the vehicle, detect deployment of an air bag, or any combination thereof.

11. The OBU of claim 8, wherein the at least one processor is further configured to temporarily store a previous M seconds of sensor information from the one or more sensors on a continuing basis, wherein the report to the server after detection of the collision includes the previous M seconds of sensor information.

12. The OBU of claim 11, the sensor information comprises at least one of camera, radar, lidar, or a combination thereof.

13. The OBU of claim 8, wherein to broadcast a message to the other entities, the at least one processor is further configured to broadcast, via the at least one wireless transceiver, the message to the other entities.

14. The OBU of claim 8, wherein the collision related information from each entity comprises one or more of BSMs received by the entity from the OBU, camera data, infrastructure related information, or a combination thereof.

15. The OBU of claim 8, wherein the message to the other entities further comprises an identifier for the server to which the other entities are to upload the collision related information.

16. A method performed by an On-Board Unit (OBU) for a vehicle for communicating collision related information, the method comprising:
   detecting a collision of the vehicle; and
   broadcasting a message to other entities after detection of the collision requesting that the other entities upload collision related information, wherein the message includes a timestamp for the collision, a list of previous temporary IDs used by the OBU in previous N seconds, and a list of previous certificates used by the OBU in the previous N seconds.

17. The method of claim 16, wherein detecting the collision of the vehicle comprises at least one of detecting an impact of the vehicle, detecting a roll-over of the vehicle, detecting deployment of an air bag, or any combination thereof.

18. The method of claim 16, wherein the collision related information from each entity comprises one or more of basic safety messages (BSMs) received by the entity from the OBU, camera data, infrastructure related information, or a combination thereof.

19. The method of claim 16, wherein the message to the other entities further comprises an identifier for a server to which the other entities are to upload the collision related information.

20. An On-Board Unit (OBU) for a vehicle configured for communicating collision related information, comprising:
   at least one wireless transceiver configured to wirelessly communicate with network entities;
   one or more sensors,
   at least one memory; and
   at least one processor coupled to the wireless transceiver, the one or more sensors, and the at least one memory, the at least one processor configured to:
   detect, via the one or more sensors, a collision of the vehicle; and
   broadcast, via the at least one wireless transceiver, a message to other entities after detection of the collision requesting that the other entities upload collision related information, wherein the message includes a timestamp for the collision, a list of previous temporary IDs used by the OBU in previous N seconds, and a list of previous certificates used by the OBU in the previous N seconds.

21. The OBU of claim 20, wherein the at least one processor is configured to detect the collision of the vehicle by being configured to at least one of detect an impact of the vehicle, detect a roll-over of the vehicle, detect deployment of an air bag, or any combination thereof.

22. The OBU of claim 20, wherein the collision related information from each entity comprises one or more of basic safety messages (BSMs) received by the entity from the OBU, camera data, infrastructure related information, or a combination thereof.

23. The OBU of claim 20, wherein the message to the other entities further comprises an identifier for a server to which the other entities are to upload the collision related information.

24. A method performed by an On-Board Unit (OBU) for a vehicle for communicating collision related information, the method comprising:
   temporarily storing previous N seconds of basic safety messages (BSMs) on a continuing basis;
   temporarily storing a previous M seconds of sensor information on a continuing basis;
   receiving a message from an OBU for a second vehicle after the second vehicle was involved in a collision, the message requesting other entities to upload collision related information, wherein the message includes a timestamp for the collision, a list of previous temporary IDs used by the OBU of the second vehicle, and a list of previous certificates used by the OBU of the second vehicle; and
   sending a report comprising the BSMs, sensor information related to the collision, the timestamp for the collision, the list of previous temporary IDs used by the OBU of the second vehicle, and the list of previous certificates used by the OBU of the second vehicle to a server.

25. The method of claim 24, wherein temporarily storing the previous N seconds of the BSMs on a continuing basis comprises:
   storing broadcast and received BSMs for N seconds in memory; and
   discarding the broadcast and received BSMs from the memory after N seconds.

26. The method of claim 24, the sensor information comprises at least one of camera, radar, lidar, or a combination thereof.

27. The method of claim 24, wherein the collision related information from each entity comprises one or more of basic safety messages (BSMs) received by the entity from the OBU, camera data related to the collision, or a combination thereof.

28. The method of claim 24, wherein the message received from the OBU for the second vehicle comprises an identifier for the server to which the report is be sent.

29. An On-Board Unit (OBU) for a vehicle configured for communicating collision related information, comprising:
   at least one wireless transceiver configured to wirelessly communicate with network entities;
   one or more sensors,
   at least one memory; and
   at least one processor coupled to the wireless transceiver, the one or more sensors, and the at least one memory, the at least one processor configured to:
   temporarily store previous N seconds of basic safety messages (BSMs) on a continuing basis;
   temporarily store a previous M seconds of sensor information from the one or more sensors on a continuing basis;
   receive, via the at least one wireless transceiver, a message from an OBU for a second vehicle after the second vehicle was involved in a collision, the message requesting other entities to upload collision related information, wherein the message includes a timestamp for the collision, a list of previous temporary IDs used by the OBU of the second vehicle, and a list of previous certificates used by the OBU of the second vehicle; and
   send, via the at least one wireless transceiver, a report comprising the BSMs, sensor information related to the collision, the timestamp for the collision, the list of previous temporary IDs used by the OBU of the second vehicle, and the list of previous certificates used by the OBU of the second vehicle to a server.

30. The OBU of claim 29, wherein the at least one processor is configured to temporarily store the previous N seconds of the BSMs on a continuing basis by being configured to:
   store broadcast and received BSMs for N seconds in memory; and
   discard the broadcast and received BSMs from the memory after N seconds.

31. The OBU of claim 29, the sensor information comprises at least one of camera, radar, lidar, or a combination thereof.

32. The OBU of claim 29, wherein the collision related information from each entity comprises one or more of basic safety messages (BSMs) received by the entity from the OBU, camera data related to the collision, or a combination thereof.

33. The OBU of claim 29, wherein the message received from the OBU for the second vehicle comprises an identifier for the server to which the report is be sent.

34. A method performed by an On-Board Unit (OBU) for a vehicle for communicating collision related information, the method comprising:
   detecting a collision of a second vehicle;
   obtaining collision related information for the collision of the second vehicle, wherein the collision related information includes at least one of a license plate number, a color, a make, or a model of the second vehicle identified using at least one camera; and
   broadcasting a message to other entities after detection of the collision, the message indicating the collision has been detected and including the collision related information.

35. The method of claim 34, wherein the collision is detected based on camera data.

36. The method of claim 34, wherein the collision related information further comprises a confidence for each of the license plate number, the color, the make, or the model of the second vehicle.

37. The method of claim 34, wherein the collision related information further comprises at least one of a speed, acceleration, path, location, or any combination thereof for the second vehicle at a time when the collision of the second vehicle was detected.

38. The method of claim 34, further comprising sending a report comprising sensor information related to the collision of the second vehicle to a server.

39. The method of claim 38, wherein the sensor information comprises at least one of camera, radar, lidar, or a combination thereof.

40. An On-Board Unit (OBU) for a vehicle configured for communicating collision related information, comprising:
- at least one wireless transceiver configured to wirelessly communicate with network entities;
- one or more sensors,
- at least one memory; and
- at least one processor coupled to the wireless transceiver, the one or more sensors, and the at least one memory, the at least one processor configured to:
- detect, via the one or more sensors, a collision of a second vehicle;
- obtain collision related information for the collision of the second vehicle, wherein the collision related information includes at least one of a license plate number, a color, a make, or a model of the second vehicle identified using at least one camera; and
- broadcast, via the at least one wireless transceiver, a message to other entities after detection of the collision, the message indicating the collision has been detected and including the collision related information.

41. The OBU of claim 40, wherein the collision is detected based on camera data.

42. The OBU of claim 40, wherein the collision related information further comprises a confidence for each of the license plate number, the color, the make, or the model of the second vehicle.

43. The OBU of claim 40, wherein the collision related information further comprises at least one of a speed, acceleration, path, location, or any combination thereof for the second vehicle at a time when the collision of the second vehicle was detected.

44. The OBU of claim 40, wherein the at least one processor is further configured to send, via the at least one wireless transceiver, a report comprising sensor information related to the collision of the second vehicle to a server.

45. The OBU of claim 44, wherein the sensor information comprises at least one of camera, radar, lidar, or a combination thereof.

* * * * *